(12) United States Patent
Vilkov et al.

(10) Patent No.: US 12,181,394 B2
(45) Date of Patent: Dec. 31, 2024

(54) METHOD AND SYSTEM FOR TRACE DETECTION OF LOW VOLATILE SUBSTANCES

(71) Applicant: Analytical Detection LLC, Mission Viejo, CA (US)

(72) Inventors: Andrey N Vilkov, Aliso Viejo, CA (US); Joseph Adam Widjaja, Laguna Hills, CA (US); Jack Albert Syage, Corona del Mar, CA (US)

(73) Assignee: ANALYTICAL DETECTION LLC, Mission Viejo, CA (US)

( * ) Notice: Subject to any disclaimer, the term of this patent is extended or adjusted under 35 U.S.C. 154(b) by 294 days.

(21) Appl. No.: 17/470,984

(22) Filed: Sep. 9, 2021

(65) Prior Publication Data

US 2023/0069942 A1    Mar. 9, 2023

(51) Int. Cl.
  *G01N 1/10* (2006.01)
  *G01N 1/44* (2006.01)
  G01N 1/02 (2006.01)

(52) U.S. Cl.
  CPC ............... *G01N 1/44* (2013.01); *G01N 1/10* (2013.01); *G01N 2001/028* (2013.01); *G01N 2001/1056* (2013.01)

(58) Field of Classification Search
  CPC ............... G01N 1/44; G01N 2001/028; G01N 2001/1056
  See application file for complete search history.

(56) References Cited

U.S. PATENT DOCUMENTS

| | | |
|---|---|---|
| 4,408,125 A | 10/1983 | Meuzelaar |
| 4,718,268 A | 1/1988 | Reid et al. |
| 5,135,549 A | 8/1992 | Phillips et al. |
| 5,988,002 A | 11/1999 | Danylewych-May et al. |
| 6,345,545 B1 | 2/2002 | Linker et al. |
| 7,458,283 B2 | 12/2008 | Nacson et al. |
| 7,947,949 B2 | 5/2011 | Chen et al. |
| 8,161,830 B2 | 4/2012 | Boudries et al. |
| 8,756,975 B2 | 6/2014 | Wu |
| 8,943,910 B2 | 2/2015 | Addleman et al. |
| 9,528,969 B2 | 12/2016 | Shaw et al. |
| 9,689,857 B1 | 6/2017 | Vilkov et al. |
| 10,345,281 B2 | 7/2019 | Kelley et al. |
| 10,458,885 B2 | 10/2019 | Shaw et al. |

(Continued)

OTHER PUBLICATIONS

Najarro et al., "Optimized thermal desorption for improved sensitivity in trace explosives detection by ion mobility spectrometry," Analyst:137(11):2614-22, Jun. 2012, 9 pp.

(Continued)

*Primary Examiner* — Jill A Warden
*Assistant Examiner* — Michael Stanley Gzybowski
(74) *Attorney, Agent, or Firm* — Shumaker & Sieffert, P.A.

(57) ABSTRACT

A system includes a conductive sampling swab including a non-mesh substrate and a thermal desorber including a clamping assembly configured to releasably hold the conductive sampling swab. The clamping assembly is configured to be electrically connected to a voltage or current source, and the thermal desorber is configured to resistively heat the conductive sampling swab to a temperature sufficient to vaporize a sample material disposed on the conductive sampling swab.

17 Claims, 11 Drawing Sheets

(56) References Cited

U.S. PATENT DOCUMENTS

| | | | |
|---|---|---|---|
| 2005/0019220 A1* | 1/2005 | Napoli | G01N 1/02 |
| | | | 250/288 |
| 2005/0288616 A1 | 12/2005 | Bozenbury, Jr. et al. | |
| 2015/0004710 A1* | 1/2015 | Gregory | G01N 27/623 |
| | | | 436/83 |
| 2016/0025605 A1 | 1/2016 | Weling et al. | |
| 2016/0233068 A1 | 8/2016 | Arnold et al. | |
| 2017/0254732 A1* | 9/2017 | Pawliszyn | B01J 20/28007 |
| 2020/0033233 A1 | 1/2020 | Thomson et al. | |

OTHER PUBLICATIONS

Staymates et al., "The effect of reusing wipes for particle collection," Int. J. Ion Mobil. Spec.19:41-49, Mar. 2016, 9 pp.

All About Electronic Circuits, "Flat spiral coil inductor calculator", 2 pp., Retrieved from the Internet on Dec. 5, 2023 from URL: https://www.circuits.dk/calculator_flat_spiral_coil_inductor.htm.

AZo Materials, "What is Ferritic Stainless Steel?", AZoNetwork, Apr. 10, 2020, 8 pp., URL: https://www.azom.com/article.aspx?ArticleID=19195.

Coil 32, "Calculate influence of shield on the inductance value", Influence of the shield, Apr. 12, 2015, 1 pp., URL: https://coil32.net/shield-inductance.html.

Collins, "Hysteresis loss and eddy current loss: What's the difference?", Motion Control Tips: A Design World Resource, WTWH Media LLC, Mar. 30, 2018, 4 pp., URL: https://www.motioncontroltips.com/hysteresis-loss/.

Highton, "Round Wire ac Resistance Calculator", Chemandy Electronics Ltd., Sep. 30, 2011, 5 pp., URL: https://chemandy.com/calculators/round-wire-ac-resistance-calculator.htm.

Induction Partner, "Austenitic or ferritic stainless steel, induction heating efficiency.", ID Partner, 2 pp., Retrieved from the Internet on Dec. 5, 2023 from URL: https://induction-partner.com/blog/2020/05/06/austenitic-or-ferritic-stainless-steel-induction-heating-efficiency/.

Karia, "4116 Steel vs 1095—What's the Difference", The Piping Mart, Jul. 18, 2023, 9 pp., URL: https://blog.thepipingmart.com/metals/4116-steel-vs-1095-whats-the-difference/.

Knight, "Wire Resistance at Various Frequencies", Amateur Radio Station VE3EFC, 6 pp., Retrieved from the Internet on Dec. 5, 2023 from URL: http://ve3efc.ca/wireohms.htm.

Landgraf et al., "On the Steinmetz hysteresis law", Journal of Magnetism and Magnetic Materials, vol. 320, No. 20, Elsevier B.V., Oct. 1, 2008, pp. e531-e534, URL: https://www.sciencedirect.com/science/article/abs/pii/S0304885308004150.

Nave, "Faraday's Law", 4 pp., Retrieved from the Internet on Dec. 5, 2023 from URL: http://hyperphysics.phy-astr.gsu.edu/hbase/electric/farlaw.html.

Nave, "Magnetic Field of Current Loop", 2023, 4 pp., Retrieved from the Internet on Dec. 5, 2023 from URL: http://hyperphysics.phy-astr.gsu.edu/hbase/magnetic/curloo.html.

RF Heating Consult, "Induction", Heating Consult: Induction Heating & RF Specialists, 1 pp., Retrieved from the Internet on Dec. 5, 2023 from URL: https://inductionheating.nl/inductie/?lang=en.

Sabry, "Magnetic Levitation: The Complete Physics of the Fastest Train Ever Built", Oct. 29, 2022, 467 pp.

Singh et al., "Eddy Current Loss Calculator", Calculatoratoz, Softusvista Inc., 3 pp., Retrieved from the Internet on Dec. 5, 2023 from URL: https://www.calculatoratoz.com/en/eddy-current-loss-calculator/Calc-34242.

Singh et al., "Hysteresis Loss Calculator", Calculatoratoz, Softusvista Inc., 3 pp., Retrieved from the Internet on Dec. 5, 2023 from URL: https://www.calculatoratoz.com/en/hysteresis-loss-calculator/Calc-34207.

Stainless Steel Guide et al., "Is Stainless Steel Magnetic? . . . It Depends", Jul. 6, 2022, 12 pp., URL: https://stainlesssteelguide.com/is-stainless-steel-magnetic-it-depends/.

U.S. Appl. No. 18/463,202, filed Sep. 7, 2023, naming inventors Vilkov et al.

Untreated_Paramediensis_Karnik et al., "What is the main mechanism for induction heaters (cookers)?", Physics, Stack Exchange Inc, Jul. 11, 2019, 17 pp., Retrieved from the Internet on Dec. 5, 2023 from URL: https://physics.stackexchange.com/questions/491092/what-is-the-main-mechanism-for-induction-heaters-cookers.

Wikipedia, "Coercivity", Wikimedia Foundation, Inc., Nov. 19, 2023, 5 pp., Retrieved from the Internet on Dec. 5, 2023 from URL: https://en.wikipedia.org/wiki/Coercivity.

Wikipedia, "Remanence", Wikimedia Foundation, Inc., Jun. 27, 2023, 4 pp., Retrieved from the Internet on Dec. 5, 2023 from URL: https://en.wikipedia.org/wiki/Remanence.

Wikipedia, "Skin effect", Wikimedia Foundation, Inc., Nov. 29, 2023, 13 pp., Retrieved from the Internet on Dec. 5, 2023 from URL: https://en.wikipedia.org/wiki/Skin_effect.

* cited by examiner

METHOD AND SYSTEM FOR TRACE DETECTION OF LOW VOLATILE SUBSTANCES

TECHNICAL FIELD

The disclosure relates to methods and systems for detection of a chemical sub stance.

BACKGROUND

Trace detection systems are designed to collect, analyze, and identify minute amounts, such as picograms or nanograms, of substances of interest that may otherwise be completely invisible to the unaided eye. Substances of interest to be detected by trace detection systems include explosives, drugs, chemical weapons, and toxic industrial chemicals. Traditionally, the trace particles are collected by an operator (e.g., a natural person) using a sampling swab. The operator swipes the suspected surface with a sampling swab and inserts the sampling swab into a thermal desorber. The thermal desorber heats the sampling swab by convective heating to evaporate the particles collected on this swab. The released vapors are ionized and subsequently analyzed. Ion Mobility Spectrometry (IMS) and Mass Spectrometry (MS) trace detectors are commonly used methods to detect explosive, narcotics, and chemical weapon threats with high sensitivity and rapid analysis capabilities.

SUMMARY

In some examples, this disclosure describes systems and techniques for trace detection of low volatility substances or materials. The systems and techniques described utilize heating to desorb and vaporize low volatility substances captured by an impermeable conductive sampling swab.

In one example, this disclosure describes a system including: a conductive sampling swab comprising a non-mesh substrate; and a thermal desorber comprising a clamping assembly configured to releasably hold the conductive sampling swab, wherein the clamping assembly is configured to be electrically connected to a voltage or current source, wherein the thermal desorber is configured to resistively heat the conductive sampling swab to a temperature sufficient to vaporize a sample material disposed on the conductive sampling swab.

In another example, this disclosure describes a method including: inserting a conductive sampling swab into a thermal desorber, wherein the conductive sampling swab comprises a non-mesh substrate; clamping, via a clamping assembly of the thermal desorber, the conductive sampling swab, wherein the clamping assembly is configured to be electrically connected to a voltage or current source; and resistively heating the conductive sampling swab, via a current applied through the conductive sampling swab, to a temperature sufficient to vaporize a sample material disposed on the conductive sampling swab.

In another example, this disclosure describes a trace detection system including: a conductive sampling swab; a thermal desorber includes a clamping assembly configured to releasably hold the conductive sampling swab, wherein the clamping assembly is configured to be electrically connected to a voltage or current source and the conductive sampling swab, wherein the clamping assembly is configured to contact the conductive sampling swab with a substantially even pressure over a first area at a first position on the conductive swab and with a substantially even pressure over a second area at a second position on the conductive swab and conduct a voltage or current to the conductive sampling swab via the first and second areas while holding the conductive sampling swab; the voltage or current source; a trace detector configured to determine at least one of a presence or a composition of a vaporized sample material, wherein the thermal desorber is configured to resistively heat a sample material disposed on the conductive sampling swab to a temperature sufficient to vaporize a sample material disposed on the conductive sampling swab by applying a current through the conductive sampling swab, wherein the trace detector is fluidically coupled to the thermal desorber and is configured to receive vaporized sample material.

In another example, this disclosure describes a conductive sampling swab including: a non-mesh substrate, wherein the conductive sampling swab is configured to be replaceably clamped by a clamping assembly of a thermal desorber, wherein the conductive sampling swab is configured to be resistively heated to a temperature sufficient to vaporize a sample material disposed on the conductive sampling swab via the application of a current through the conductive sampling swab by the thermal desorber.

In another example, this disclosure describes a thermal desorber including: a clamping assembly configured to releasably hold a conductive sampling swab, wherein the clamping assembly is configured to be electrically connected to a voltage or current source, wherein the clamping assembly is configured to be electrically connected to the conductive sampling swab, wherein the thermal desorber is configured to resistively heat the conductive sampling swab to a temperature sufficient to vaporize a sample material disposed on the conductive sampling swab.

The details of one or more examples are set forth in the accompanying drawings and the description below. Other features, objects, and advantages will be apparent from the description and drawings, and from the claims.

DETAILED DESCRIPTION

Figure 1:
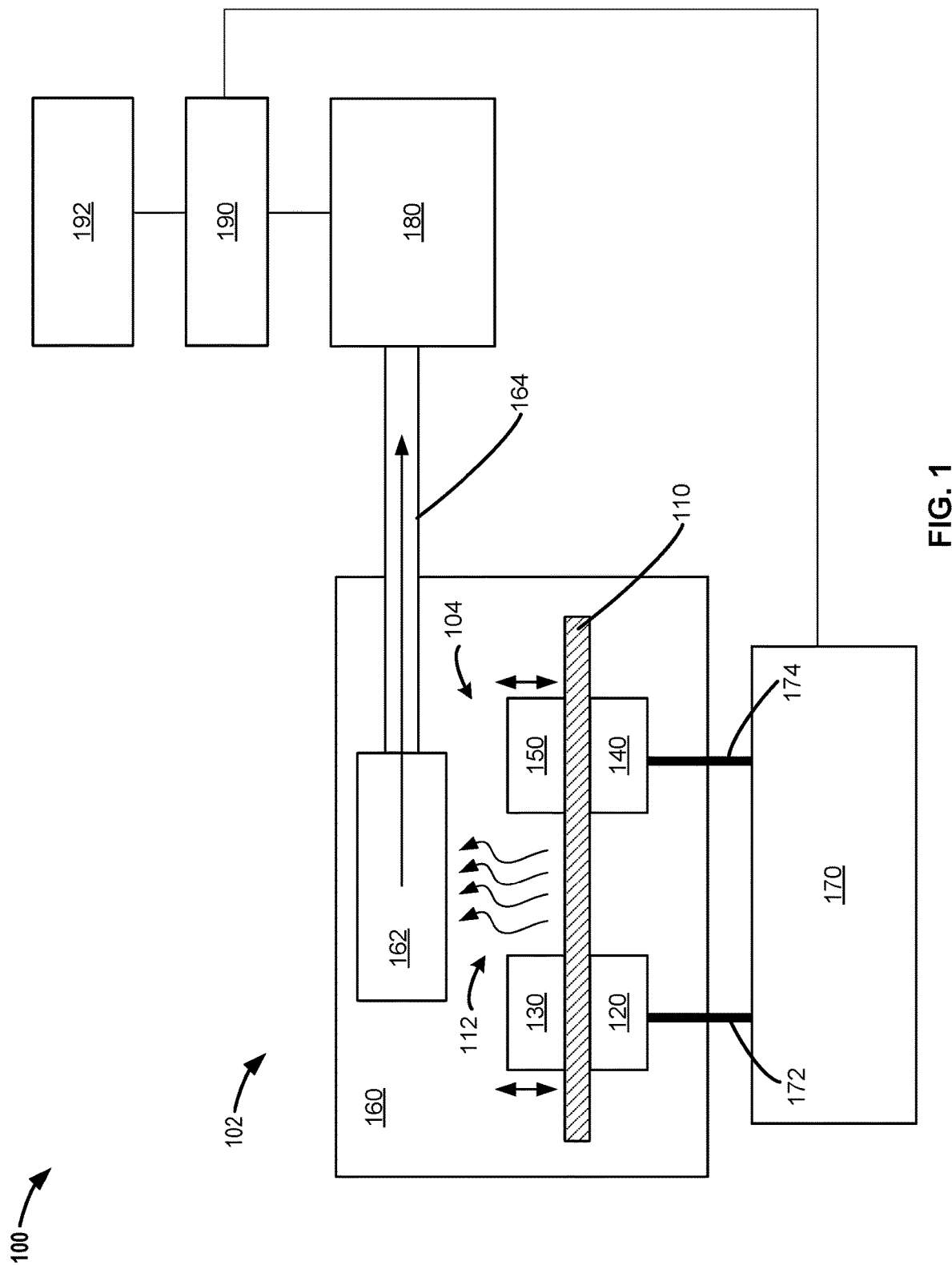
FIG. 1 is a block diagram illustrating an example trace detection system.

In some examples, the disclosure describes systems and methods for trace detection of sample materials. In some examples, the systems and methods disclosed include a conductive sampling swab having an impermeable substrate, e.g., substantially gas, water, and/or air impermeable and/or non-transmissive to a gas, water, water vapor, moisture, air. For example, the conductive sampling swab may be continuous (e.g., non-mesh) such that gas, water or water vapor, or air may not pass or transmit through the thickness of the conductive sampling swab, e.g., within a period such as hours and/or days. The conductive swab may be configured to be heated via resistive heating to a temperature sufficient to vaporize a sample material disposed on the conductive sampling swab. In some examples, the conductive sampling swab is configured to be inserted into a thermal desorbing including a clamping assembly. The clamping assembly may be configured to releasably hold the conductive sampling swab and configured to be electrically connected to a voltage or current source. The clamping assembly may further be configured to be electrically connected to the conductive sampling swab.

The systems and methods of the present disclosure provide for improved detection of substances having a low volatility (e.g., explosives) through direct heating of an impermeable conductive sampling swab via an electric current passed through the conductive sampling swab.

Physically swiping surfaces is a common method for collecting sample materials that may be of security and/or forensic interest. The sampling swabs are typically porous allowing trace particles to be trapped within pores or to attach by other mechanical means. Fiber-based swabs may include natural fibrous materials such as muslin and cellulose and/or synthetic materials such as Nomex® and Teflon™-coated fiberglass. The porosity of a sampling swab may be designed to match the maximum dimensions of measured and/or simulated size distributions for particle sizes of common explosive and narcotic materials. However, the porosity or roughness of a sampling swab can cause abrasion of the sampled surface causing unintended surface (matrix) material to adhere to the sampling swab in addition to the sample material and potentially interfere with the detection of the sample material.

After the sample is collected, the swab is inserted into a thermal desorber and heated by convective heating to release the vapors of collected chemical substances. It is commonly accepted that slow heating rates are preferential for enhanced sensitivity, e.g., low or slow heating rates give clearer desorption separation between compounds with low vapor pressure versus high vapor pressure. Thermal desorbers may have a toaster-like design where the air gap between the flat heaters and sampling swab limits the heating rate and also serve as a conduit directing released vapors into a chemical analyzer.

Sampling swabs should be durable, free of impurities, and capable of withstanding high temperatures. The temperatures of the thermal desorber used for detection of explosive and narcotic samples may be limited to about 240 degrees Celsius (° C.) or to about 150° C., even though some compounds of interest, such as inorganic salts, may require temperatures of 700° C. or higher to efficiently desorb from the swab surface. For example, the thermal desorber may be limited by the power and time required to convectively heat the swab, or heat the swab via infrared radiation, inside a hot enclosure with limited heat transfer, e.g., through a volume of air in which the swab is positioned. Additionally, the swab itself may not be able to withstand temperatures significantly above 250° C.

Further, accumulation of moisture, e.g., water and/or water vapor, inside the pores of sampling swabs exposed to ambient conditions may degrade the performance of trace detectors. For example, water vapor loaded into an IMS trace detector along with the sample material may cause ion peak positions to be substantially shifted from their known positions.

Generally, trace detection systems and methods may focus on sample collection efficiency, e.g., to increase a detectable signal. However, methods for improvement of trace system sensitivity based on a cumulative response of a chemical substance may be impractical.

In accordance with the systems and methods disclosed herein, trace detection may focus on improving the signal-to-noise ratio of a chemical substance of interest within just a subset of consecutive scans. In some examples, the heating rate of a sampling swab may be increased, rather than decreased, to allow one or more substances of interest to be sampled over a shorter period of time and thereby increase a peak signal intensity of one or more of the substances of interest. In some examples, the increased heating rates are achieved via direct heating, e.g., resistive heating, of a conductive sampling swab.

In some examples, a conductive sampling swab comprises a non-mesh substrate, and optionally a coating disposed on a major surface of the substrate. In some examples, the conductive sampling swab may be a metal foil, e.g., the non-mesh substrate may comprise a metal foil. The conductive sampling swab may be a configured to retain a sample material, e.g., on a major surface of the conductive sampling swab such as a major surface of the non-mesh substrate or optionally a major surface of a coating disposed on the non-mesh substrate. The conductive sample swab may be configured to be repeatably clamped by a clamping assembly of a thermal desorber. The conductive sampling swab may be further configured to be resistively heated to a temperature sufficient to vaporize the sample material via the application of a current through the conductive sampling swab by the thermal desorber.

In some examples, the conductive sampling swab may be configured to be heated via flash heating. For example, the thermal desorber may cause a power source, e.g., a voltage or current source, to cause a current to flow through the sampling swab via the clamping assembly to flash heat the sampling swab to the temperature sufficient to vaporize the sample material with a relatively high heating rate, e.g., 50° C., and/or within in a relatively short period of time, e.g., within a few minutes or within a few seconds. For example, the conductive sampling swab may be durable and thin, e.g., with a low thermal mass allowing the mass to heat at the relatively high rate. The conductive sampling swab may also be configured to be heated to higher temperatures than conventional swabs, enabling desorption of involatile chemical compounds such as inorganic salts, e.g., to a temperature equal to or greater than 500° C., or 700° C., or higher. In some examples, the conductive sampling swab may be non-abrasive and non-porous, e.g., the conductive sampling swab may reduce collection of substrate materials on which the conductive sampling swab is swabbed, such as vinyl or plastics, via reduced abrasion with the substrate material while still collecting the sample material of interest. In other words, the conductive sampling swab may reduce and/or eliminate contamination, increase the signal-to-noise ratio, and reduce and/or eliminate false positives and/or false negatives in identification of the presence of a sample material of interest. In some examples, the conductive sampling swab may reduce and/or eliminate accumulation of water or moisture on or within the conductive sampling swab, allowing the sampling swab to be used and/or stored in a variety of environmental conditions (e.g., different ambient temperatures and/or humidity during storage and/or sample collection or swabbing).

FIG. 1 is a block diagram illustrating an example trace detection system 100. In the example shown, system 100 includes conductive sampling swab 110, thermal desorber 102 including clamping assembly 104, electric current controller 170, chemical analysis device 180, data acquisition/control module 190 and computing device 192. The example shown in FIG. 1 is representative of conductive sampling swab 110 clamped, via clamping assembly 104, and in position to be heated. In some examples, conductive sampling swab 110 may be insertable and removable from clamping assembly 104, e.g., to allow for sample collection or swabbing (e.g., a surface) with conductive sampling swab 110.

Conductive sampling swab 110 may be configured to be used by an operator to physically swipe a surface of interest and collect an amount of a sample material on a surface of conductive sampling swab 110, e.g., such that the amount of sample material is disposed on conductive sampling swab 110. Conductive sampling swab 110 may be configured to be held by the operator by hand (e.g., with or without gloves) or by an extended sample holder or wand, or by any other suitable means. Conductive sampling swab 110 may be configured to be placed in thermal desorber 102, e.g., by hand or by the extended sample holder or wand, or by any suitable means. For example, the operator may place conductive sampling swab 110 inside enclosure 160 after swiping sampling swab 110 to collect an amount of a sample material.

In some examples, conductive sampling swab 110 may include a non-mesh substrate, e.g., a substrate that is not a knit, woven, or knotted material of open texture. The non-mesh substrate may comprise a metal or metal alloy. For example, conductive sampling swab 110 may include a metal foil formed of, e.g., a carbon steel such as 1095 carbon steel, a spring steel, or any suitable metal. In some examples, conductive sampling swab 110 may be substantially elastic, that is, conductive sampling swab 110 may resume its normal shape after being stretched or compressed. For example, conductive sampling swab 110 may be configured to be bent, stretched, or otherwise deformed, e.g., to at least partially conform to the shape of a surface that an operator is swiping with conductive sampling swab 110, and return to its original size and/or shape after being bent, stretched, or deformed. In some examples, conductive sampling swab 110 may have a Young's modulus greater than or equal to 9,000 kilopounds per square inch (ksi) and/or a resistivity greater than or equal to 50 micro Ohm-centimeters (μΩ-cm).

In some examples, conductive sampling swab 110 may be configured to be resistively heated, e.g., via direct heating, joule heating, or the like, to a temperature sufficient to vaporize the sample material disposed on conductive sampling swab 110. For example, conductive sampling swab 110 may be configured to withstand being heated to temperatures equal to or greater than 500° C., or 700° C., without vaporizing material comprising conductive sampling swab 110, e.g., without vaporizing the non-mesh substrate, coating, and/or any other layers or materials comprising conductive sampling swab 110, e.g., such as intermediate coatings and/or binder or primer layers.

Thermal desorber 102 is configured to hold and resistively heat conductive sampling swab 110. For example, thermal desorber 102 may include clamping assembly 104. Clamping assembly 104 is configured to releasably hold conductive sampling swab 110. In some examples, clamping assembly 104 is configured to be electrically connected to a voltage or current source, e.g., electric current controller 170. In some examples, clamping assembly 104 may be configured to be electrically connect to conductive sampling swab 110, e.g., with a substantially even pressure and/or electrical contact within one or more areas of contact. For example, clamping assembly 104 may be used for resistively heating, as well as clamping, conductive sampling swab 110. In other examples, the resistive heating may be performed by components other than those used to clamp the swab, e.g., clamping assembly 104 may clamp conductive sampling swab 110 while a separate electrical connector may be used to resistively heat conductive sampling swab 110.

In some examples, clamping assembly 104 is configured to conduct an electrical current through conductive sampling swab 110 via one or more contact areas and substantially evenly within those contact areas, e.g., to avoid spatial "spikes" in charge density at contact points between clamping assembly 104 and conductive sampling swab 110 that may burn, degrade, ablate, or otherwise locally degrade the material of conductive sampling swab 110 due to a large local current and/or charge density. In other words, at contact positions between clamping assembly 104 and conductive sampling swab 110, the clamping assembly 104 is configured to spread the charge density over an area substantially evenly. In some examples, clamping assembly 104 is configured to contact conductive sampling swab 110 with a substantially even pressure over a first area at a first position on conductive swab 110 and with a substantially even pressure over a second area at a second position on conductive swab 110 and conduct a voltage or current to conductive sampling swab 110 via the first and second areas while holding conductive sampling swab 110. In other words, clamping assembly 104 may be an electrical connection apparatus between electric current controller 170 and conductive sampling swab 110 configured to mechanically hold conductive sampling swab 110 without damaging conductive sampling swab 110 and electrically connect sampling swab 110 such that electric current controller 170 may provide a relatively large current to conductive sampling swab 110 to heat conductive sampling swab 110 without localized damage (e.g., burning, ablating, and the like) to conductive sampling swab 110 at the electrical contact positions. In some examples, clamping assembly 104 may be substantially similar to clamping assembly 200 illustrated and described below with reference to FIG. 2.

In the example shown, clamping assembly 104 is disposed within enclosure 160. Enclosure 160 may include a sample opening, or aperture, through which an operator may insert or remove conductive sampling swab 110 into clamping assembly 104. In the example shown, clamping assembly 104 includes clamps 120, 130, 140, and 150. Clamps 120 and 140 are stationary, and clamps 130 and 150 are configured to move relative to stationary clamps 120, 140, e.g., towards and away from stationary clamps 120, 140 in the directions indicated by the arrows in FIG. 1. In other examples, clamps 130, 150 may be stationary and clamps 120, 140 may be configured to move relative to clamps 130, 150, and in other examples all of clamps 120, 130, 140, and 150 may be configured to move relative to each other.

In the example shown, stationary clamp 120 and movable clamp 130 are configured to clamp (e.g., releasably hold) conductive sampling swab 110 at a first position, e.g., a front position which may be closer to a front edge of conductive sampling swab 110, with front being defined relative to the sample opening of enclosure 160. Clamps 120, 130 may clamp conductive sampling swab 110 by contacting conductive sampling swab 110 substantially evenly across a first bottom side area on a first major surface of conductive sampling swab 110 by stationary clamp 120 and by contacting conductive sampling swab 110 substantially evenly across a first top side area on a second major surface of conductive sampling swab 110 by movable clamp 130. Similarly, in the example shown, stationary clamp 140 and movable clamp 150 are configured to clamp (e.g., releasably hold) conductive sampling swab 110 at a second position, e.g., a back position which may be farther to a front edge of conductive sampling swab 110 relative to the sample opening of enclosure 160. Clamps 140, 150 may clamp conductive sampling swab 110 by contacting conductive sampling swab 110 substantially evenly across a second bottom side area on a first major surface of conductive sampling swab 110 by stationary clamp 140 and by contacting conductive sampling swab 110 substantially evenly across a second top side area on a second major surface of conductive sampling swab 110 by movable clamp 150. Clamps 120, 130, 140, 150 may define the location, size, and shape of the contact areas, e.g., clamp 120 defining first bottom side area, clamp 130 defining first top side area, clamp 140 defining second bottom side area, and clamp 150 defining second top side area. In the example shown, "top" and "bottom" are relative to a vapor collection assembly 162 included thermal desorber 102, e.g., within enclosure 160, with "top" being closer to vapor collection assembly 162 and "bottom" being opposite top from vapor collection assembly 162.

In some examples, clamps 120, 130, 140, and 150 may conform to the surface shapes of the respective major surfaces of conductive sampling swab 110, or conductive sampling swab 110 may be configured such that its major surfaces conform to the surface shape of the contact surfaces of clamps 120, 130, 140, and 150, e.g., so as to apply substantially even pressure and to make a substantially even electrical connection over the surface areas in contact between clamps 120, 130, 140, and 150 and the major surfaces of conductive sampling swab 110.

For example, conductive sampling swab 110 may have substantially flat major (e.g., top and bottom) surfaces, and the contacting surfaces of clamps 120, 130, 140, and 150 may have substantially flat contacting surfaces. In some examples, clamps 120, 130, 140, and 150 may be configured to releasably hold conductive sampling swab 110 in a substantially coplanar orientation, e.g., clamps 120 and 140 are substantially coplanar such that when movable clamps 130, 150 press against the top surface of conductive sampling swab 110 the conductive sampling swab 110 is held substantially without being bent, twisted, or otherwise deformed. Additionally, clamps 120, 130, 140, and 150 may be configured to releasably hold conductive sampling swab 110 with flat top and bottom with substantially even contact over the respective contact areas, e.g., without an angle between the planes defined by the contacting surfaces of clamps 120, 130, 140, and 150 and the top and bottom surfaces of conductive sampling swab 110. In some examples, the moving clamps may be on opposite sides of conductive sampling swab 110, e.g., clamps 120 and 150 may be moving, and clamps 130 and 140 may be stationary, or vice versa. In some examples, there may be only one set of clamps, e.g., clamps 120, 130. In some examples, there may be only one clamp, e.g., 120, which may be a moving clamp configured to hold conductive sampling swab 110 against a stationary backing material.

In some examples, the contacting surfaces of clamps 120, 130, 140, and 150 may have a sharp or serrated edge. For example, the sharp or serrated edge may be configured to press into a substrate or a coating (e.g., substrate 302 and/or coating 304 described below at FIG. 3) to hold and electrically connect to conductive sampling swab 110.

In the example shown, clamping assembly 104 is configured to be electrically connected to a voltage or current source, e.g., electrical current source 170 via electrical connectors 172, 174. In the example shown, clamps 120 and 140 are electrically connected to electrical current source 170. Generally, any of clamps 120, 130, 140, or 150 may be electrically connected to electrical current source 170. In some examples, none of clamps 120, 130, 140, and 150 are connected to electrical current source 170, and clamping assembly 104 includes electrical connectors 172, 174 which may be configured to electrically connect conductive sampling swab 110 to electrical current source 170.

In some examples, the operator may insert conductive sampling swab 110 into enclosure 160 and manually operate clamping assembly 104 to clamp conductive sampling swab 110. In some examples, clamping by clamping assembly 104 may be initiated by data acquisition/control module 190, computing device 192, or any other suitable device, e.g., in response to a proximity sensor indicating the presence of conductive sampling swab 110 or in response to an action by the operator such as pushing a button or a user interface object of data acquisition/control module 190, computing device 192, or any other suitable device configured to cause clamping assembly 102 to clamp and/or unclamp.

In the example shown, enclosure 160 may be sealed (fully or partially) to prevent surrounding air and/or contaminants from entering chemical analysis device 180, e.g., via vapor collection assembly 162 and/or vapor conduit 164. Enclosure 160 may be heated to avoid condensation of vapors of chemical substances inside enclosure 160.

Thermal desorber 102 includes vapor collection assembly 162, which may be configured to collect vapor 112 including vaporized sample material that has been vaporized from conductive sampling swab 110. Vapor collection assembly 162 may be fluidically connected to vapor conduit 164, both of which may be fluidically coupled to chemical analysis device 180 and configured to cause vapor to flow to chemical analysis device 180, e.g., via a fan. In some examples, any or all vapor collection assembly 162, vapor conduit 164, or chemical analysis device 180 may be configured to ionize vapor 112.

In some examples, thermal desorber 102 may be configured to flash heat conductive sampling swab 110 to a temperature sufficient to vaporize the sample material disposed on the conductive sampling swab 100, e.g., in a few seconds or less. In some examples, the flash heating may comprise heating conductive sampling swab 110, e.g., via resistive heating, to the temperature in, or five seconds or less, or two seconds or less. In some examples, the temperature sufficient to vaporize the sample material disposed on the conductive sampling swab may be greater than or equal to 500° C., or 700° C. In some examples, the sample material may comprise at least one of an explosive, a narcotic, a chemical warfare agent, a pesticide, a toxic industrial chemical, or a pharmaceutical trace contaminant. In some examples, the sample material may comprise at least one of sodium nitrate, potassium nitrate, strontium nitrate, barium nitrate, sodium chlorate, potassium chlorate, sodium perchlorate, potassium perchlorate, sodium permanganate, or potassium permanganate. Thermal desorber 102 may be configured to vaporize any of the above mentioned sample materials, e.g., heat conductive sampling swab 110 to a temperature sufficient to vaporize any of the above sample materials.

Chemical analysis device 180 may be a trace-detector configured to determine any or all of the presence of vaporized sample material, a composition of sample material, an amount of the sample material, and/or an amount of each component of the composition of the sample material. In some examples, chemical analysis device 180 may be an ion mobility spectrometer, a semiconductor gas sensor, a Raman spectrometer, a mass spectrometer, a gas chromatograph, a chemiluminescence-based detector, an electrochemical sensor, an infrared spectrometer, or any suitable trace-detector or any combination thereof.

Computing device 192 may include a processor and/or processing circuitry and memory, and may be configured to control trace detection system 100 and/or any of its components, e.g., thermal desorber 102, clamping assembly 104, electric current controller 170, chemical analysis device 180, data acquisition/control module 190, and/or any other hardware of trace detection system 100, e.g., motors to move clamps 130, 150, a pump to move vapor 112 to chemical analysis device 180, and the like. In some examples, computing device 192 may be substantially similar to computing device 28 further illustrated and described below with reference to FIG. 9.

In some examples, data acquisition/control module 190 may be configured to control trace detection system 100 and/or any of its components, e.g., based on instructions from processing circuitry of computing device 192. In some examples, processing circuitry and/or memory of computing device 192 may be configured to receive data from data acquisition/control module 190 and/or chemical analysis device 180, and processing circuitry of computing device 192 may be configured to determine any of the presence of vaporized sample material, a composition of sample material, an amount of the sample material, and/or an amount of each component of the composition of the sample material.

Figure 2:
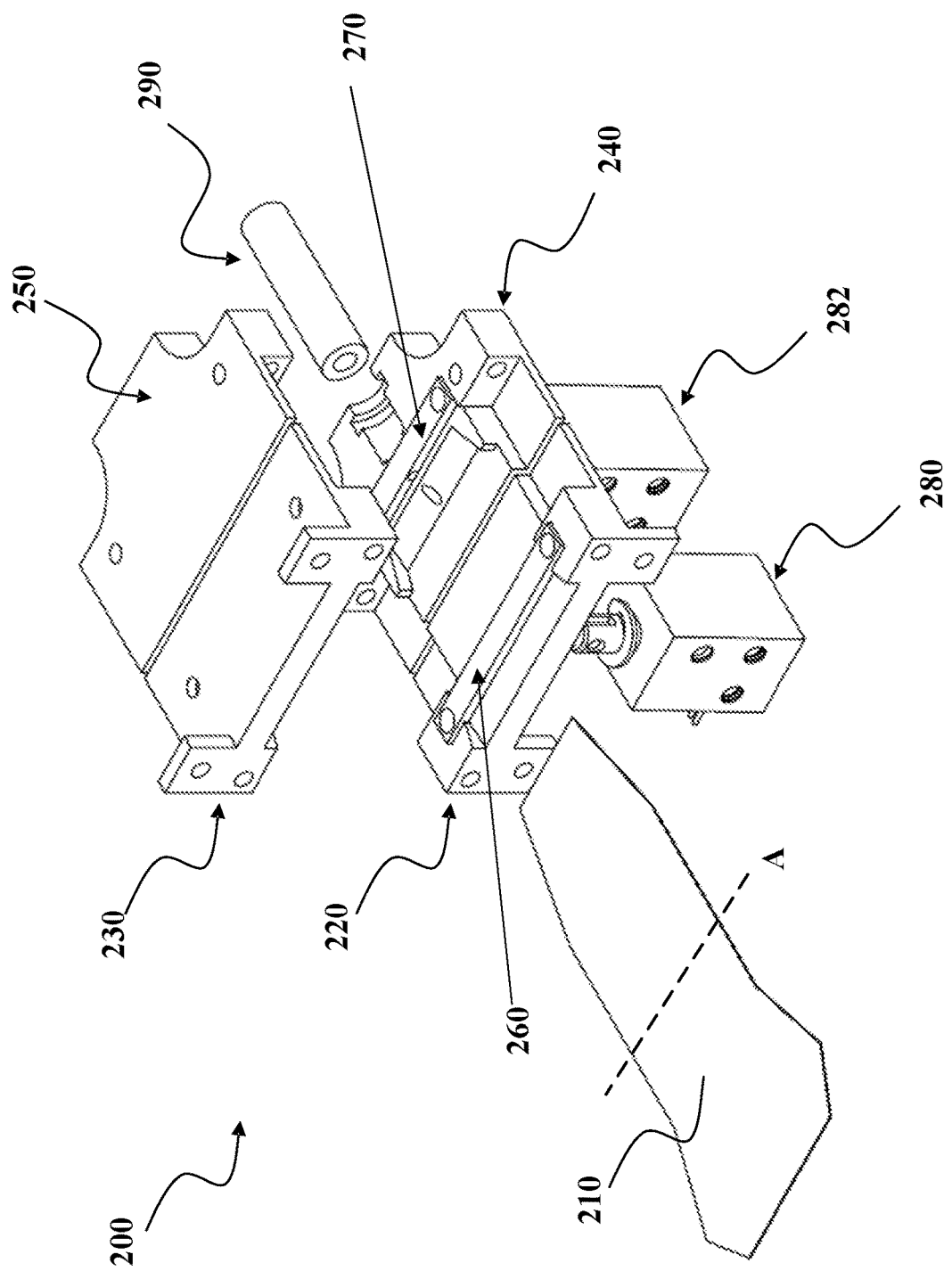
FIG. 2 is a schematic illustration of an example clamping assembly and conductive sampling swab.

FIG. 2 is a schematic illustration of an example clamping assembly 200 and conductive sampling swab 210. Conductive sampling swab 210 may be substantially similar to conductive sampling swab 110 of FIG. 1 and/or conductive sampling swab 210 illustrated and described below with reference to FIG. 3. Clamping assembly 200 may be substantially similar to clamping assembly 102 of FIG. 1.

In the example shown, clamping assembly 200 includes conductive sampling swab 210, four separate enclosure sections 220, 230, 240, 250, clamps 260 and 270, solenoid actuators 280 and 282 and transfer line 290 fluidically connecting enclosure sections 220, 230, 240, 250 with a chemical detection device, e.g., chemical analysis device 180 of FIG. 1.

Clamp 260 is located within enclosure section 220 and is driven by solenoid actuator 280. Clamp 270 is located within enclosure section 240 and is driven by solenoid actuator 282. In other examples, stepper motors may be used instead of solenoid actuators. In some examples, clamps 260, 270 may be actuated manually by non-electric mechanical means (for example using lever connectors).

In the example shown, stationary clamps may be integrated within enclosure sections 230 and 250. Front enclosure sections 220 and 230 are connected to electrical ground. Back enclosure sections 250 and 240 are normally connected to ground electrical ground, except when heating. Clamping assembly 200 may include one or more detectors, e.g., optical sensors, configured to determine when conductive sampling swab 210 is fully inserted and ready to be clamped. A control module may be configured to activate solenoid actuators 280 and 282, e.g., based on a determination that conductive sampling swab 210 is fully inserted into clamping assembly 200 and is ready to be clamped, causing clamps 260, 270 to move to clamp conductive sampling swab 210 at two locations and/or positions. The control module may be configured to deactivate solenoid actuators 280 and 282, causing clamps 260, 270 to move to release conductive sampling swab 210.

In the example shown, back enclosure section 250 may be configured to be electrically connected to a voltage or current source, and electrically connected to conductive sampling swab 210 when in a clamped position. Back enclosure section 250 may be configured to apply a relatively low voltage or conduct a relatively low voltage supplied by the voltage/current source, to conductive sampling swab 210 and cause an electric current to flow through conductive sampling swab 210. In some examples, the voltage applied to conductive sampling swab 210 may be 3 volts or less, and the electrical current may be a direct current (DC) ranging from 10 amperes (A) to 50 A. In some examples, conductive sampling swab 210 may have a relatively low conductance, e.g., conductive sampling swab 210 may comprise stainless steel, and thereby conduct the desired current at the desired voltage at voltage/current ranges that may be within the ranges of commercially available electrical power supplies. When assembled, enclosure sections 220, 230, 240, 250 may form at least a partially sealed enclosure, where background air may enter only through the front slit substantially near conductive sampling swab 210. In some examples, enclosure sections 220, 230, 240, 250 may be configured to reduce and/or eliminate vapor condensation, e.g., enclosure sections 220, 230, 240, 250 may be heated. In some examples, enclosure sections 220, 230, 240, 250 may be heated by a flat ceramic heater (not shown in FIG. 2). Transfer line 290 may be heated by a flexible Kapton heater (also not shown in FIG. 2). In some examples, enclosure sections 220, 230, 240, 250 may be controlled, e.g., via the controller, to be at a temperature of about 150° C., and transfer line 290 may be controlled to be at a temperature of about 180° C.

Figure 3:
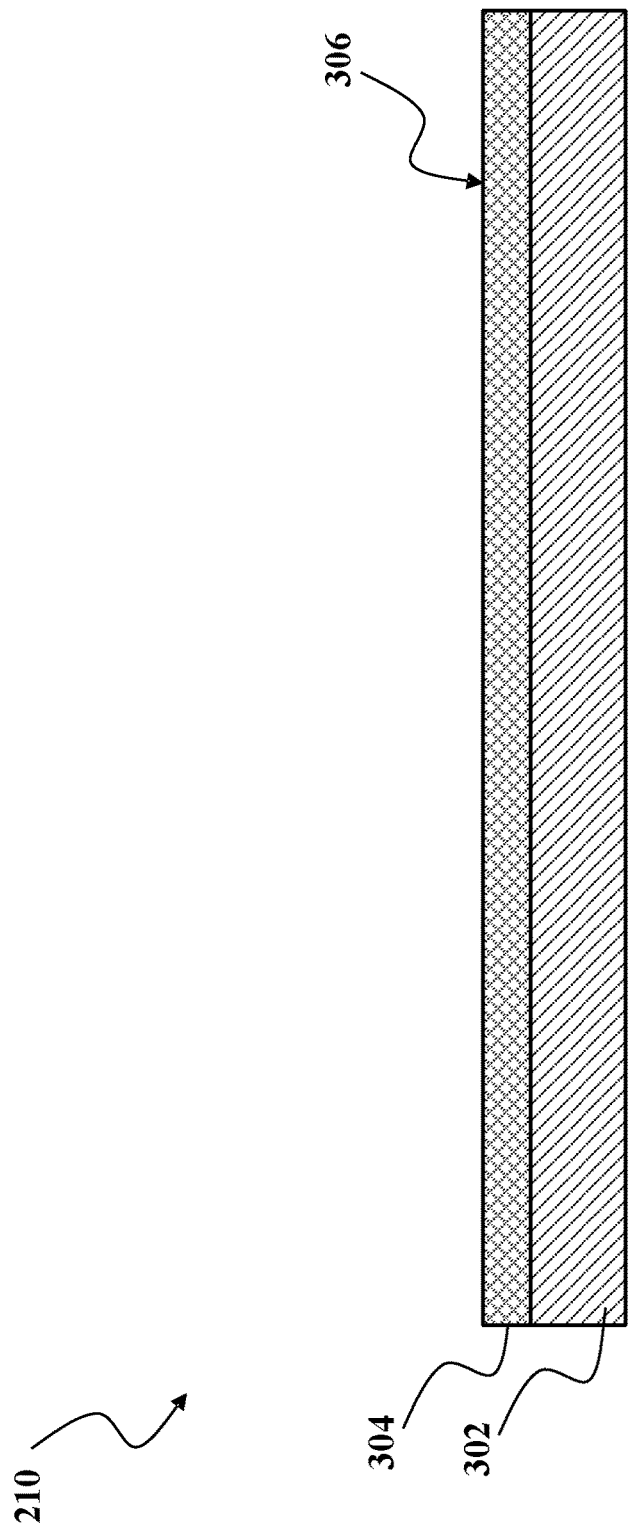
FIG. 3 is a cross-sectional view of an example conductive sampling swab.

FIG. 3 is a cross-sectional view of an example conductive sampling swab 210, the cross-section being taken along line A of FIG. 2. Conductive sampling swab 210 includes substrate 302, coating 304, and surface 306. In some examples, conductive sampling swab 210 includes additional layers, e.g., a primer or binder layer (not shown) between substrate 302 and coating 304 configured to increase and/or improve adhesive of coating 304 to substrate 302. In some examples, conductive sampling swab 210 may not include coating 304, and surface 306 may be a surface of substrate 302 rather than coating 304.

Substrate 302 may be a non-mesh substrate. For example, substrate 302 may be a nonwoven material. In some examples, substrate 302 may be a continuous and/or substantially solid material, e.g., a metal foil. In other examples, substrate 302 may be non-mesh and include one or more through holes. In some examples, substrate 302 may be patterned, for example, substrate 302 may be a metal foil stamped with a pattern to reduce weight and/or surface area, e.g., so as to reduce a thermal mass and resistively heat at a greater rate.

In some examples, substrate 302 may be conductive, and in other examples substrate 302 may be substantially non-conductive and coating 304 may be conductive. For example, substrate 302 may comprise a non-conductive material such as a fiberglass, Nomex®, or any other suitable non-conductive material, and coating 304 may be conductive. In some examples, substrate 302 may comprise a composite material, e.g., conductive, non-conductive, or a composite of both conductive and non-conductive materials.

Substrate 302 may be substantially non-absorbent. For example, substrate 302 may be a solid material, or a porous material sealed by coating 304, and substrate 302 may be configured to not trap and/or absorb fluids, such as water.

In some examples, substrate 302 may be substantially impermeable, e.g., substantially gas, water, and/or air impermeable and/or substantially non-transmissive to a gas, water, water vapor, moisture, and/or air. In some examples, substrate 302 may have a water vapor transmission rate (WVTR) of less than or equal to 0.01 grams per meter squared per day (g/(m$^2$*day)) For example, the conductive sampling swab may be continuous such that gas, water or water vapor, or air may not pass or transmit through the thickness of the conductive sampling swab, at least within a substantial period of time such as hours and/or days.

Substrate 302 may be a metal or metal alloy substrate, such as a metal foil, and may be configured to retain a sample material, e.g., any of, but not limited to, the sample materials described herein. In some examples, the metal foil may be a carbon steel, such as 1095 carbon steel, a spring steel, or any suitable metal or alloy or combination thereof. In some examples, substrate 302 may comprise a plurality of fibers and a filler or binder material, e.g., filling fiber gaps.

Substrate 302 may have any thickness suitable for using conductive sampling swab 210, e.g., a thickness enabling conductive sampling swab 210 to be handled, used as a swab, and resistively heated to the temperature sufficient to vaporize a sample material. In some examples, substrate 302 may have a thickness greater than or equal to about 10 micrometers and less than or equal to about 130 micrometers thick.

Coating 304 may be a graphite coating, a graphene coating, or any suitable coating or combination thereof. In some examples, coating 304 may be electrically conductive, e.g., coating 304 may include conductive material and/or a metal. In other examples, coating 304 may be non-conductive, e.g., and substrate 302 may be conductive. In some examples where coating 304 is non-conductive, coating 304 may include uncoated areas or areas with conductive material, e.g., to provide an electrical connection from surface 306 to substrate 304.

In the example shown, coating 304 is disposed on one major surface of substrate 302. In some examples, conductive sampling swab 210 may include a coating 304 on both major surfaces of substrate 302 (e.g., on both sides of substrate 302), and may further include any associated primer/binder layers between substrate 302 and either coating 304, and the coatings 304 on both sides of substrate 302 may be the same as each other, or may be different from each other, and may be any of the coatings 304 described herein.

In some examples, coating 304 may be substantially non-absorbent. In some examples, coating 304 and may be configured to seal substrate 302, e.g., coating 304 may be substantially impermeable to a gas or fluid, such as air, water, and/or water vapor.

Surface 306 may be configured to pick up and/or capturing sample material. In some examples, surface 306 may be configured to be substantially smooth and/or planar. In other examples, surface 306 may be configured to have a surface roughness. For example, surface 306 may have a surface arithmetic roughness average (Ra) of greater than or equal to 0.1 micrometers, greater than or equal to 0.2 micrometers, greater than or equal to 0.25 micrometers, greater than or equal to 0.45 micrometers, or greater than or equal to 0.6 micrometers. In some examples, surface 306 may have a surface roughness from being abraded with an abrasive, e.g., 240 grit sandpaper. In some examples, the sample material may be at least one of an explosive, a narcotic, a chemical warfare agent, a pesticide, a toxic industrial chemical, or a pharmaceutical trace contaminant, or at least one of sodium nitrate, potassium nitrate, strontium nitrate, barium nitrate, sodium chlorate, potassium chlorate, sodium perchlorate, potassium perchlorate, sodium permanganate, or potassium permanganate.

Conductive sampling swab 210 may be configured to be resistively heated to a temperature sufficient to vaporize the sample material, e.g., via the application of a current through one or both of substrate 302 and coating 304 by a thermal desorber, e.g., thermal desorber 102 (FIG. 1). In some examples, the temperature sufficient to vaporize the sample material is greater than or equal to 500° C., or greater than or equal to 700° C.

Conductive sampling swab 210 may configured to be removably clamped by a clamping assembly of a thermal desorber. For example, conductive sampling swab 210 may be configured to be inserted, clamped, heated, and removed from the clamping assembly, and conductive sampling swab 210 may be configured to be reused.

Conductive sampling swab 210 may be substantially elastic, that is, substrate 302 and coating 304 may resume their normal shape after being stretched or compressed. For example, conductive sampling swab 210 may be configured to be bent, stretched, or otherwise deformed, e.g., to at least partially conform to the shape of a surface that an operator is swiping with conductive sampling swab 210, and return to its original size and/or shape after being bent, stretched, or deformed. In some examples, conductive sampling swab 210, or either of substrate 302 or coating 304, may have a Young's modulus greater than or equal to 9,000 kilopounds per square inch (ksi) and/or a resistivity greater than or equal to 50 micro Ohm-centimeters (μΩ-cm).

Figure 4:
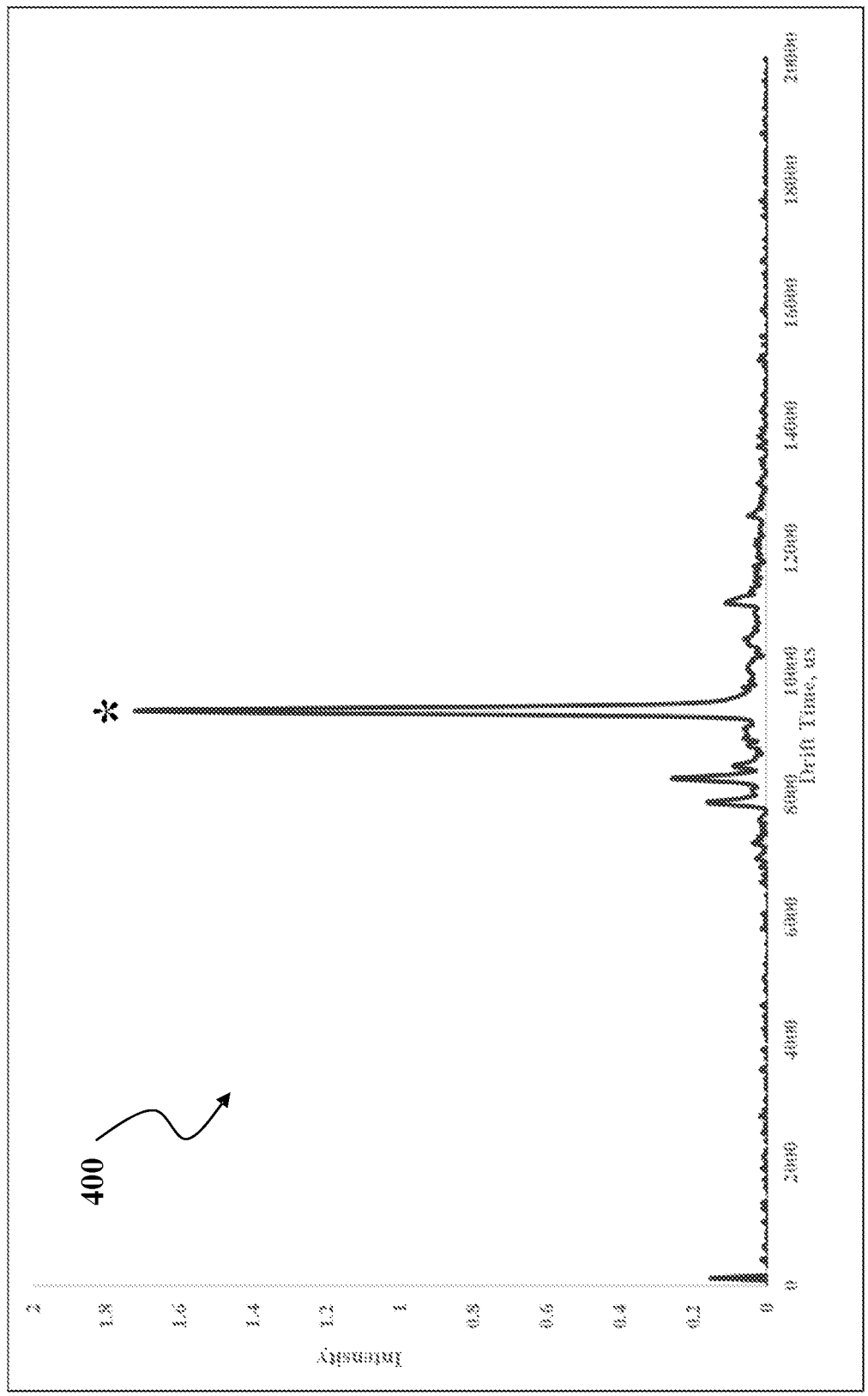
FIG. 4 is a plot of an example ion mobility plasmagram of a TNT (trinitrotoluene) trace sample collected via an example trace detection system.

FIG. 4 is a plot of an example ion mobility plasmagram of a TNT sample. In the example shown, plot 400 may be an ion mobility plasmagram of an ion mobility-based trace detector operating in a negative mode. In the example shown, 1 microliter of TNT solution (1 nanogram/microliter in methanol) was directly deposited on conductive sampling swab 210 and dried out. The conductive sampling swab 210 was made of 304 stainless steel foil having a 0.001 inch thickness. Plasmagram 400 illustrates a high signal-to-noise ratio for TNT ion peak 202 with a low (e.g., "clean") chemical background, indicating that conductive sampling swab 210 has a reduced, or zero, accumulation of environmental contaminants, including water. In the example shown, conductive sampling swab 210 has improved (e.g., less) accumulation of environmental contaminants and water as compared with a fiberglass or a Nomex® sampling swab.

Figure 5A:
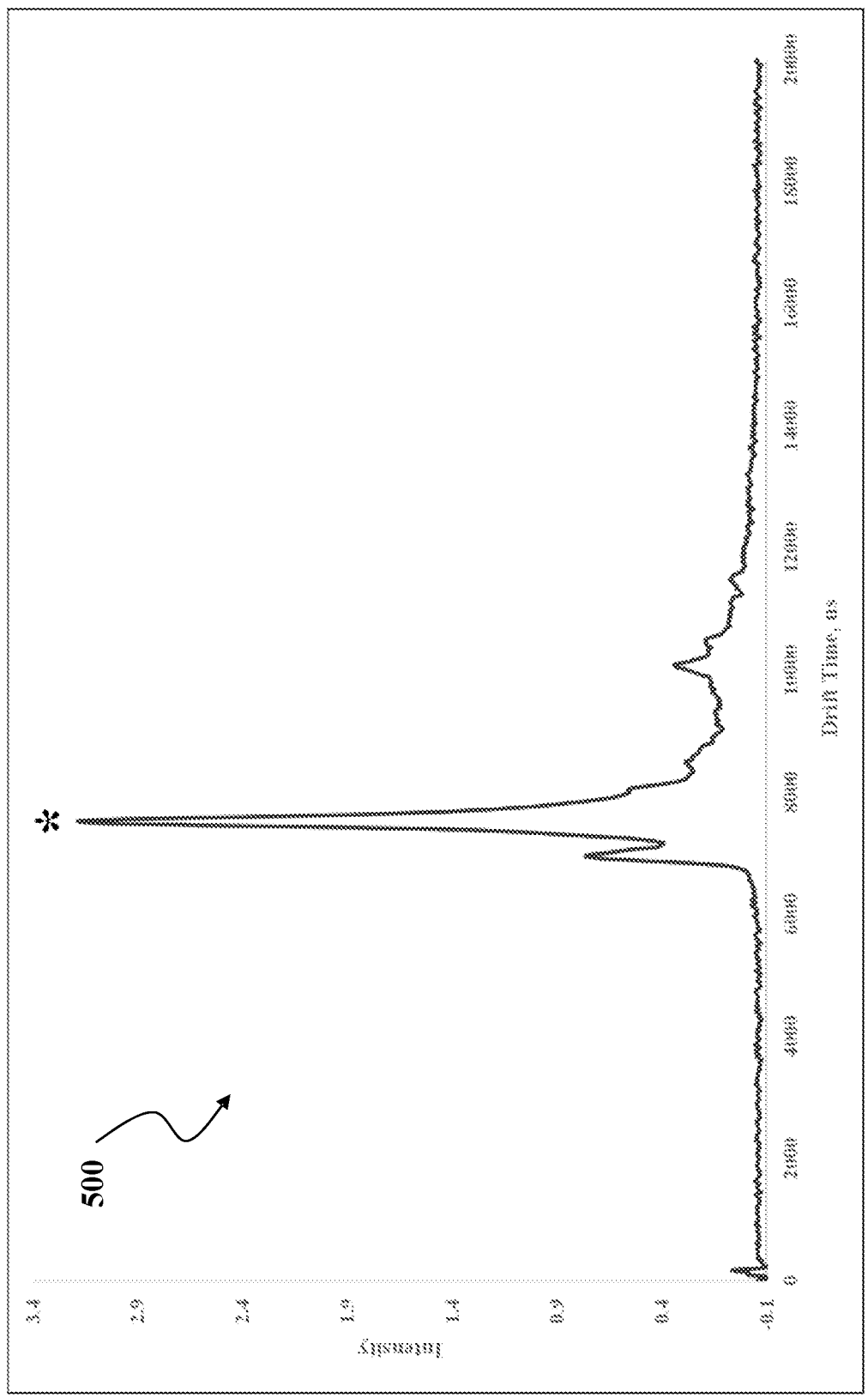
FIG. 5A is a plot of an example ion mobility plasmagram of a potassium chlorate (KClO3) trace sample collected via an example trace detection system.
Figure 5B:
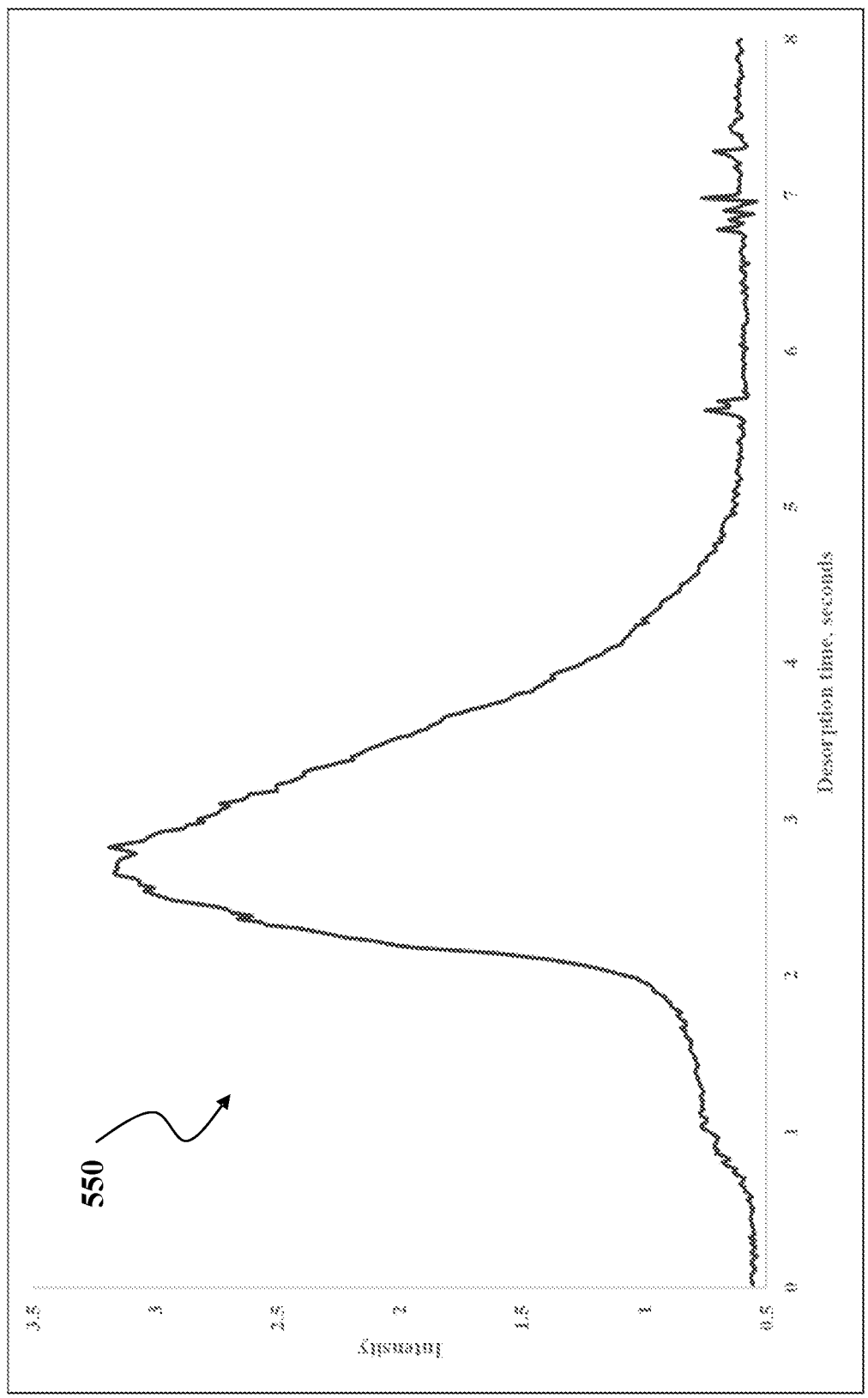
FIG. 5B is a plot of an example desorption profile of a potassium chlorate (KClO3) trace sample collected via an example trace detection system.
Figure 6A:
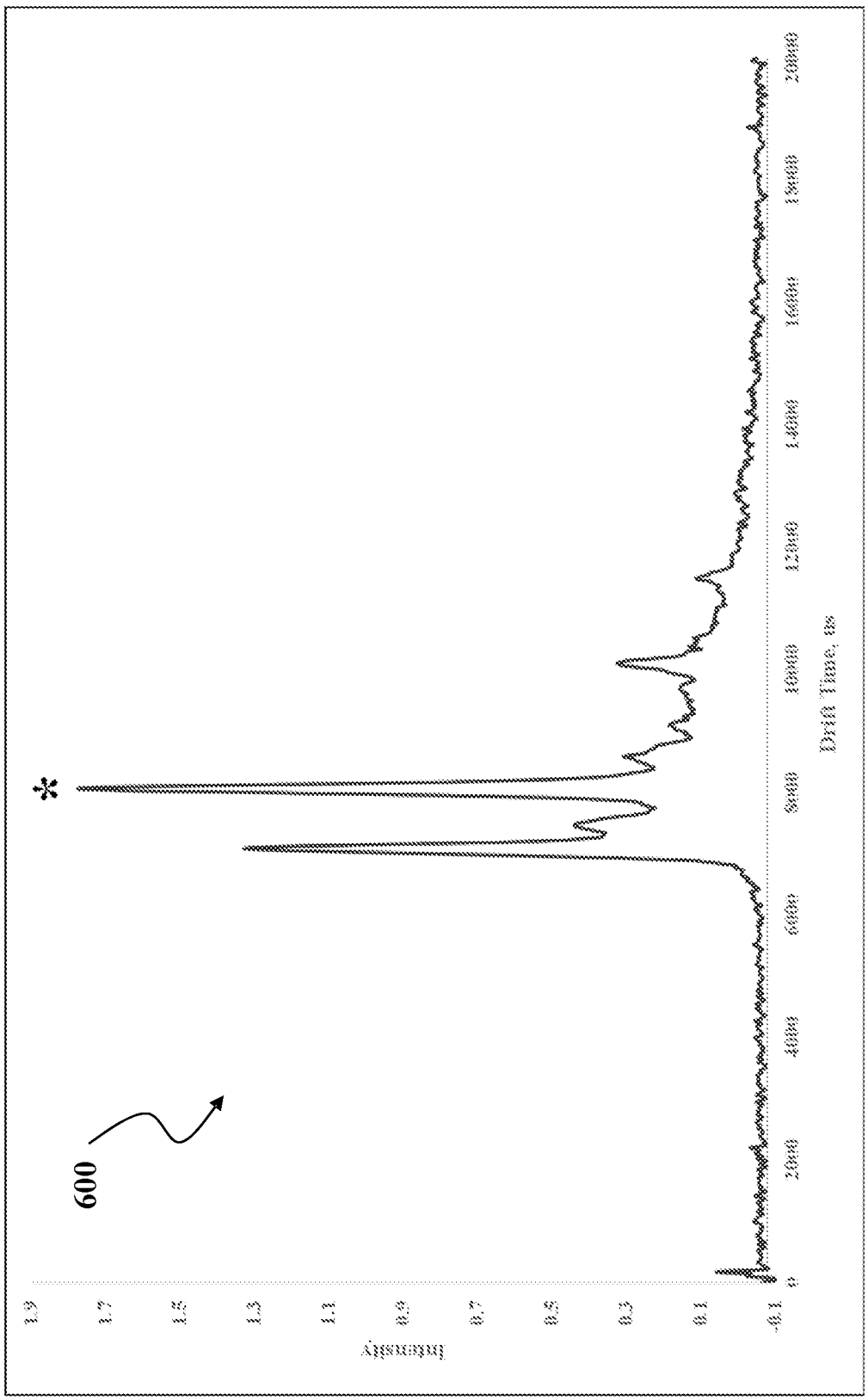
FIG. 6A is a plot of an example ion mobility plasmagram of a potassium perchlorate (KClO4) trace sample collected via an example trace detection system.
Figure 6B:
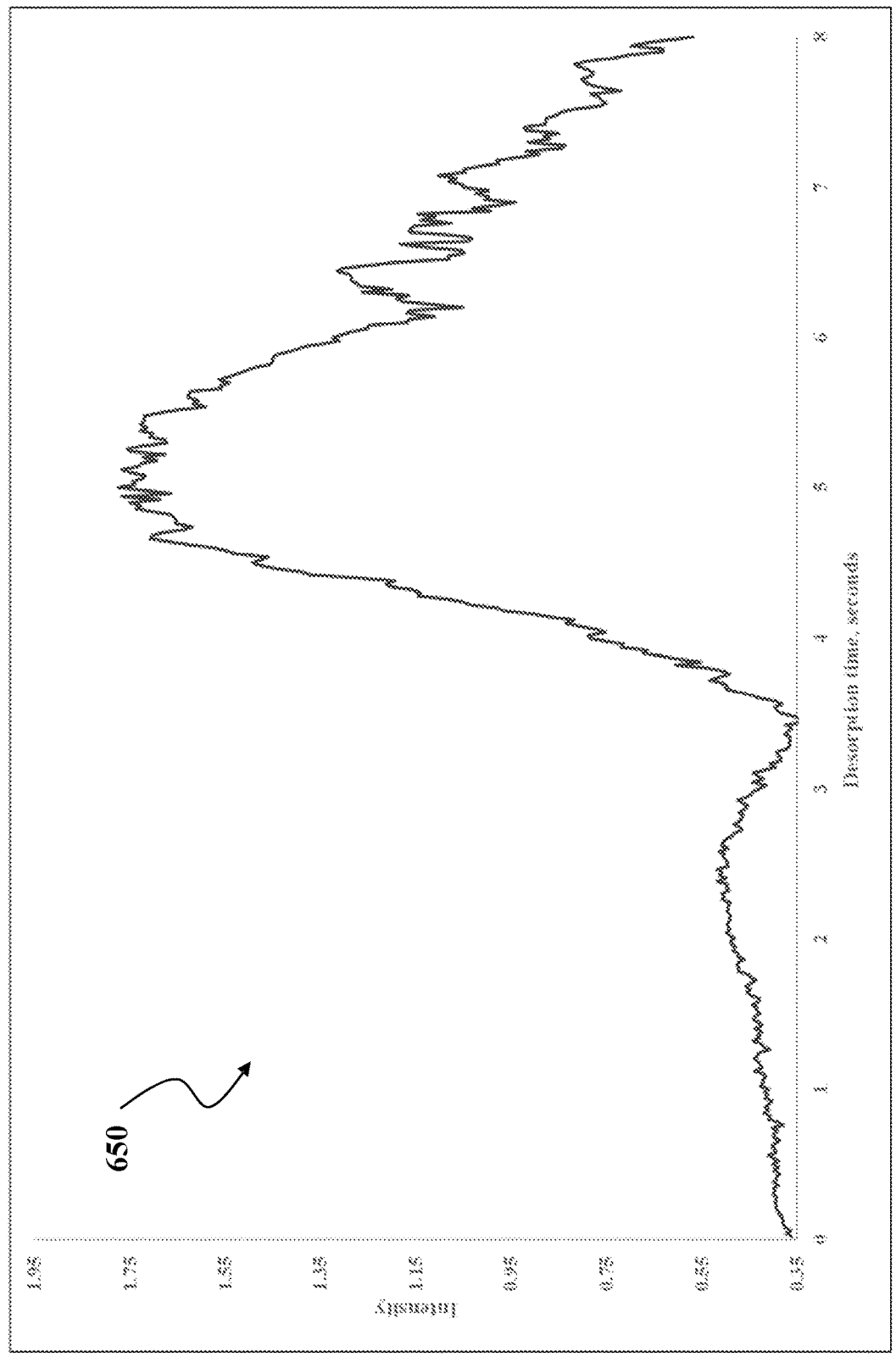
FIG. 6B is a plot of an example desorption profile of a potassium perchlorate (KClO4) trace sample collected via an example trace detection system.

FIG. 5A is a plot of an example ion mobility plasmagram 500 of a collected potassium chlorate (KClO3) sample using ion mobility-based trace detector operating in a negative mode. FIG. 5B is a plot of an example desorption profile 550 of a collected KClO3 sample. FIG. 6A is a plot of an example ion mobility plasmagram 600 of a collected KClO4 sample using an ion mobility-based trace detector operating in a negative mode. FIG. 6B is a plot of an example desorption profile 650 of a collected KClO4 sample. FIGS. 5A, 5B, 6A, and 6B are described concurrently below.

Inorganic salts represent a class of substances with vapor pressure much lower than a vast majority of explosive or narcotics substances. At the same time, there is a pressing need to detect these substances at trace levels together with other substances of interest using the same detection system. Potassium chlorate (KClO3) and potassium perchlorate (KClO4) represent practical examples of low volatility samples and are inorganic salts with melting points of 356° C. and 525° C., respectively.

In the examples shown, nanograms level solutions of KClO3 and KClO4 salts in water were directly deposited on a conductive sampling swab 210. Conductive sampling swab 210 was made of 304 stainless steel foil having a 0.001 inch thickness. The solutions were then dried out. Conductive sampling swab 210 was then rapidly heated, e.g., via thermal desorber 102 of FIG. 1, with a DC electric current of approximately 25 amperes for 8 seconds of heating duration. Conductive sampling swab 210 reached a temperature of approximately 700° C. Desorption profiles 550 and 650 may indicate an amount of desorption of a sample material from conductive sampling swab 210. In the example shown in FIGS. 5B, about 100% of the KClO3 sample deposited on conductive sampling swab 210 was desorbed from the surface of conductive sampling swab 210 within 8 seconds of direct (e.g., resistive) heating of conductive sampling swab 210. In the example shown in FIG. 6B, about 80% of the KClO4 sample deposited on conductive sampling swab 210 (e.g., a different conductive sampling swab 210 or the same conductive sampling swab 210 after cleaning) was desorbed from the surface of conductive sampling swab 210 within 8 seconds of direct (e.g., resistive) heating of conductive sampling swab 210.

Figure 7:
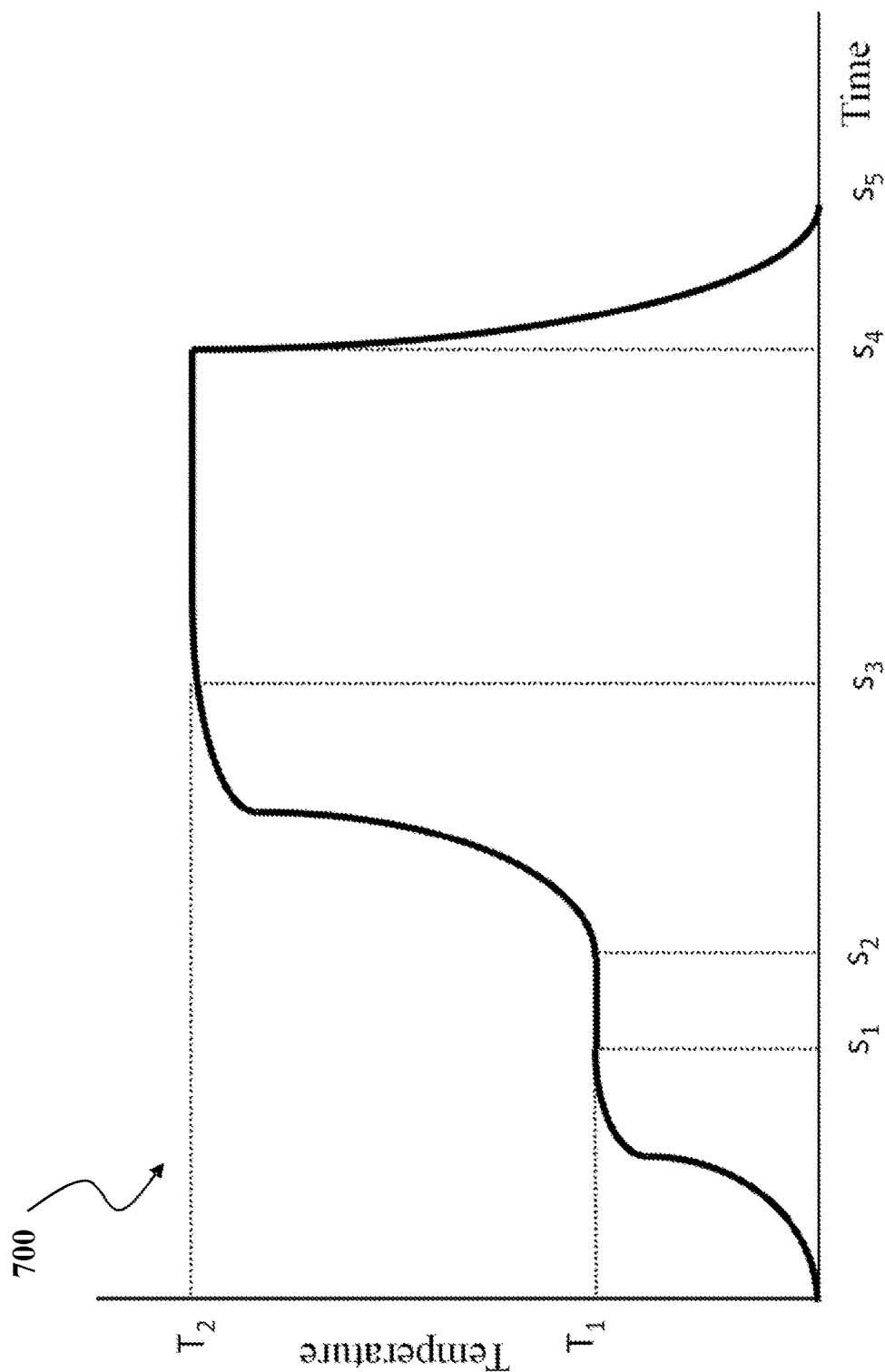
FIG. 7 is a plot of an example heating temperature profile for a conductive sampling swab.

FIG. 7 is a plot of an example heating temperature profile 700 for a conductive sampling swab. In some examples, a thermal desorber may be configured to cause a conductive sampling swab to have temperature profile 700, e.g., via resistive heating. For example, conductive sampling swab 210 may be inserted into thermal desorber 102 and clamped by clamping assembly 104 or clamping assembly 200. Computing device 192 (or computing device 28 described below) may be configured to cause data acquisition/control module 190 to activate electric current controller 170 to provide a current through conductive sampling swab 210 according to a pre-programmed time profile and/or pattern, e.g., to heat conductive sampling swab over a period of time to the temperature profile 700. For example, the temperature of conductive sampling swab 210 may be directly proportional to the current applied to conductive sampling swab 210 by current controller 170.

In some examples, computing device 192 may be configured enhance the sensitivity of chemical analysis device 180 toward one or more samples of interest, or certain groups of substances of interest. In the example shown, temperature profile 700 increases to a first temperature T1 within an amount of time between zero seconds and time s1, e.g., for an amount of time s1. The temperature remains substantially constant at T1, e.g., the temperature "plateaus" at a first plateau for an amount of time between times s1 and s2. The temperature then increases to a second, higher temperature T2 between times s2 and s3, e.g., for an amount of time s3–s2, and remains relatively constant at a second plateau at T2 between times t3 and t4, e.g., for an amount of time t4–t3. Computing device 192 may be configured enhance the sensitivity of chemical analysis device 180 by causing the temperature of conductive sampling swab 210 to follow temperature profile 700, and a first sample of interest may desorb at the first temperature T1 between times s1 and s2 for analysis by chemical analysis device 180. A second sample of interest may have a higher desorption temperature, and may not desorb from conductive sampling swab 210 between times s1 and s2. The second sample of interest may instead desorb at higher temperature T2 between times s3 and s4 for analysis by chemical analysis device 180. The time between s1 and s2 may be such that all of the first sample is desorbed between times s1 and s2, and only the second sample of interest is desorbed between times s3 and s4.

In other examples, computing device 192 may be configured to cause data acquisition/control module 190 to activate electric current controller 170 to provide a current through conductive sampling swab 210 to achieve a different temperature profile 700 of conductive sampling swab 210, or any suitable temperature profile 700 of conductive sampling swab 210. For example, computing device 192 may cause conductive sampling swab 210 to have a temperature profile 700 with more or fewer plateaus, temperature ramp ups and ramp downs with any suitable shape, e.g., linear, quadratic, any higher order polynomial shape, exponential, or any more or less complex temperature profile shape. For example, computing device 192 may be preprogrammed to cause both the current and/or voltage to be applied to conductive sampling swab 210 to have any suitable temperature profile 700 to enhance the sensitivity of chemical analysis device 180 toward one or more samples of interest.

Figure 8:
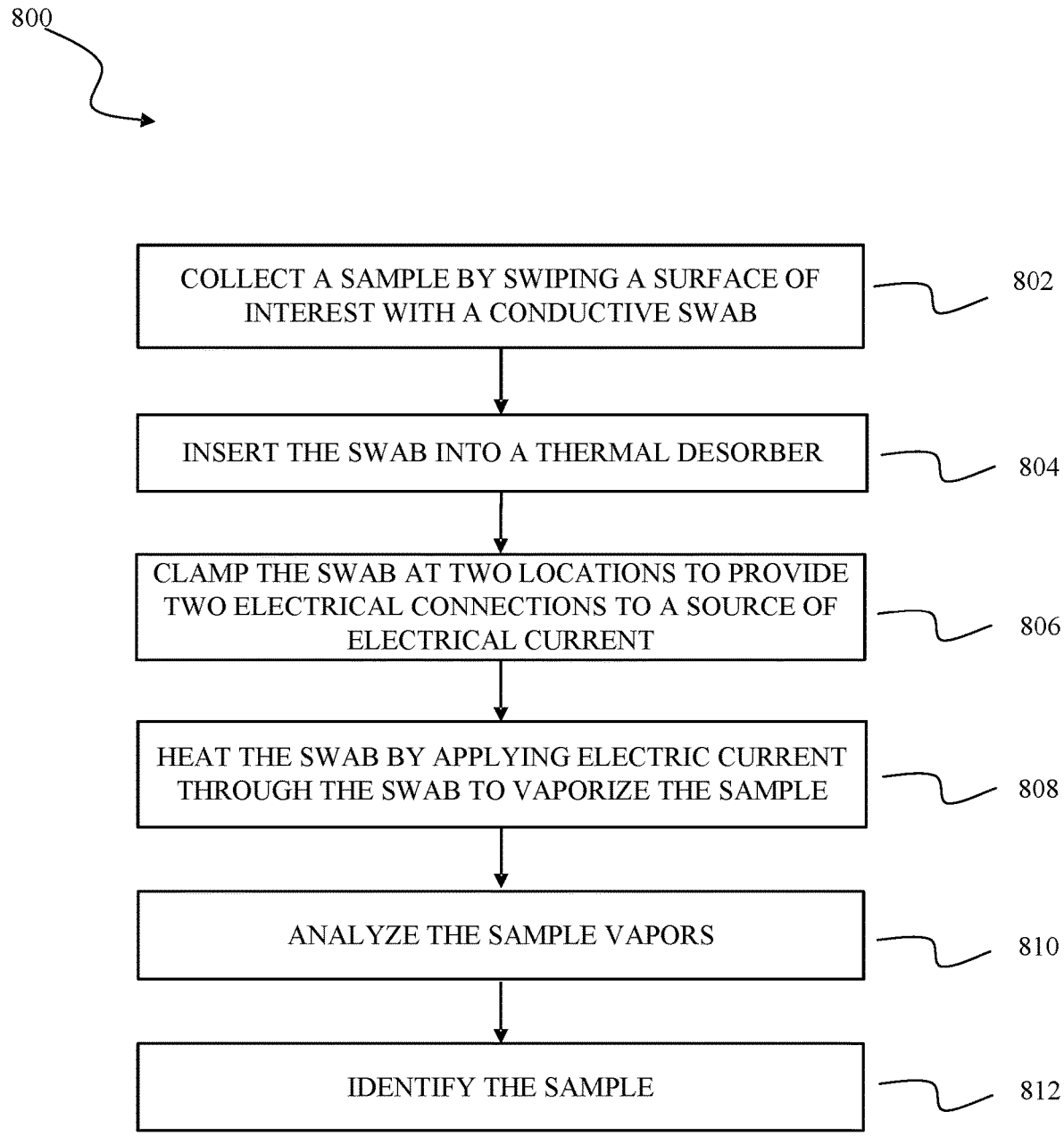
FIG. 8 is a flow diagram of an example method of detecting a trace amount of a low volatility sample material.

FIG. 8 is a flow diagram of an example method 800 of detecting a trace amount of a low volatility sample material. Although FIG. 8 is discussed using trace detection system 100 of FIG. 1, computing device 28 of FIG. 9, and conductive sampling swab 210 of FIG. 3, is to be understood that the methods discussed herein may include and/or utilize other systems and methods in other examples.

An operator (e.g., a user, a person) may collect a sample of a material and/or substance of interest by swiping a surface of interest with conductive sampling swab 210 (802). The operator may insert conductive sampling swab 210 thermal desorber 102 (804). Conductive sampling swab 210 may comprise a impermeable substrate, e.g., substrate 302.

Computing device 28 (e.g., processors 30 or processing circuitry) may cause clamping assembly 104 to clamp conductive sample 210 at two locations or positions to provide an electrical connection to a source of electrical current, e.g., electric current controller 170 (806). For example, a detector (e.g., an optical detector) may sense the position of conductive sampling swab 210 during insertion step (804), and computing device 28 may determine that the conductive sampling swab 210 is in a positioned to be clamped and may cause motors, solenoids, stepper motors or the like to move one or more clamps to clamp and hold the conductive sampling swab 210. In some examples, computing device 28 may indicate to the operator, e.g., via UI devices 32, to manually move one or more clamps to clamp and hold the conductive sampling swab 210, e.g., via a lever or other mechanism. In some examples, the operator may indicate to computing device 28, e.g., via UI devices 32, to move one or more clamps to clamp and hold the conductive sampling swab 210, e.g., via pressing a button or using a UI device 32. In some examples, clamping step (806) may be performed solely by the operator, e.g., the operator may be able to see when conductive sampling swab 210 is in position to be clamped and may manually clamp conductive sampling swab 210 with one or more clamps via a mechanism and without an action by computing device 28. Clamping assembly 104, e.g., the one or more clamps, may be configured to be electrically connected to electric current controller 170, and the one or more clamps may be conductive and configured to be electrically connected to conductive sampling swab 210 to provide an electrical connection between electric current controller 170 and conductive sampling swab 210 to allow a current to flow through conductive sampling swab 210.

Computing device 28 may cause electric current controller 170 to heat conductive sampling swab 210 via applying an electric current through conductive sampling swab 210 (808). For example, computing device 28 may cause data acquisition/control module 190 to activate electric current controller 170 to provide a current through conductive sampling swab 210. Electric current controller 170 may then apply a voltage between front and back clamps of clamping assembly 104 to pass electric current through conductive sampling swab 210. In some examples, the front clamp may be connected to ground to ensure safety of operation, while the back clamp may be connected to an electric potential above or below ground. The electric current may be constant or varied in time. Computing device 28 may control, in real time, the intensity of the electric current and duration of a desorption interval or period, or the intensity of the electric current and duration of a desorption interval or period may be pre-programmed at a hardware level. The electric current may be either direct current (DC) or alternating current (AC). In some examples, electric current controller 170 may provide the electric current in a pulsed fashion (for example, using pulse-width and/or pulse-frequency modulation).

Computing device 28 may cause electric current controller 170 to resistively heat conductive sampling swab 210 to a temperature sufficient to cause full or partial vaporization of the sample material disposed on conductive sampling swab 210, e.g., to a temperature greater than or equal to 500° C., or 700° C. Vapor collection assembly 162 and vapor conduit 164 may then transport the generated vapors of the sample material to a trace detection system, e.g., chemical analysis device 180. In some examples, computing device 28 may cause current controller 170 to heat conductive sampling swab 210 repeatedly, e.g., according to a set of time intervals. In some examples, each time interval may have a different electric current and duration. In some examples, computing device 28 may cause current controller 170 to heat conductive sampling swab 210 with a varied time duration and varied current amount, e.g., a varied time and current amount specific to vaporize a specific sample material and/or chemical substance. In some examples, computing device 28 may cause current controller 170 to flash heat conductive sampling swab 210 to the temperature sufficient to vaporize the sample material disposed on the conductive sampling swab, e.g., in eight seconds or less, or in five seconds or less, or in two seconds or less. In some examples, computing device 28 may cause current controller 170 to heat conductive sampling swab 210 according to a temperature profile, e.g., temperature profile 700 of FIG. 7.

Computing device 28 may cause chemical analysis device 180 to analyze the sample vapors (810). In some examples, analysis at (810) may occur at least partially simultaneously with heating at (808).

Computing device 28 may identify the sample material (812). For example, trace detection control unit 20 may receive analysis data from chemical analysis device 180 and may determine the presence of vaporized sample material, a composition of the sample material, an amount of the sample material, and/or an amount of each component of the composition of the sample material.

In some examples, method 800 may be used to identify a sample material comprising at least one of an explosive, a narcotic, a chemical warfare agent, a pesticide, a toxic industrial chemical, or a pharmaceutical trace contaminant. In some examples, method 800 may be used to identify a sample material comprising at least one of sodium nitrate, potassium nitrate, strontium nitrate, barium nitrate, sodium chlorate, potassium chlorate, sodium perchlorate, potassium perchlorate, sodium permanganate, or potassium permanganate.

Figure 9:
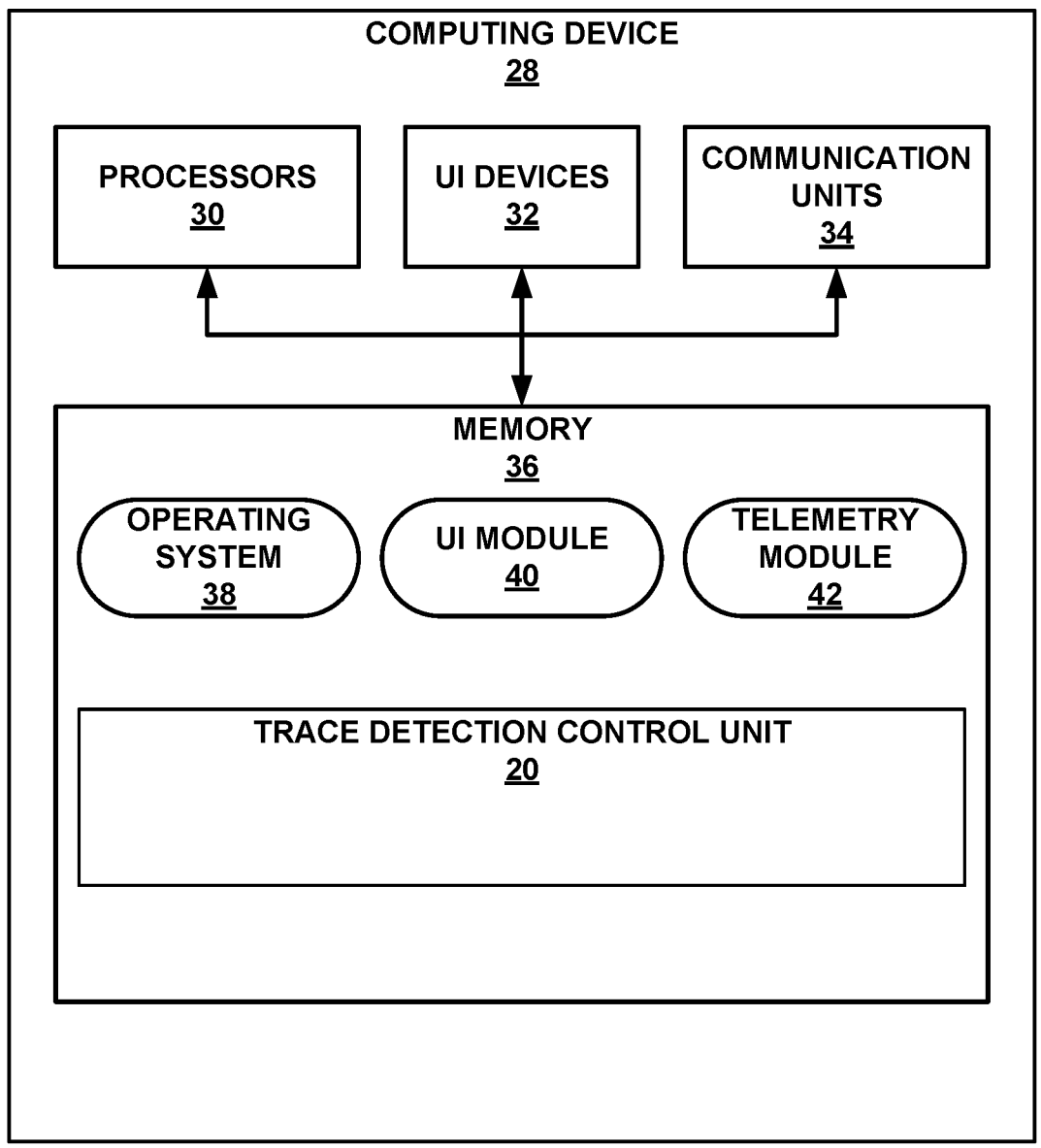
FIG. 9 is a block diagram illustrating an example computing device configured to control a trace detection system.

FIG. 9 is a block diagram illustrating an example computing device 28 configured to control a trace detection system. In some examples, computing device 28 may be substantially similar to computing device 190 of FIG. 1.

As shown in the example of FIG. 9, computing device 28 includes one or more processors 30, one or more user interface (UI) devices 32, one or more communication units 34, and one or more memory units 36. Memory 36 of computing device 28 includes operating system 38, UI module 40, telemetry module 42, and authentication unit 20, which are executable by processors 30. Each of the components, units or modules of computing device 28 are coupled (physically, communicatively, and/or operatively) using communication channels for inter-component communications. In some examples, the communication channels may include a system bus, a network connection, an inter-process communication data structure, or any other method for communicating data.

Processors 30, in one example, may comprise one or more processors that are configured to implement functionality and/or process instructions for execution within computing device 28. For example, processors 30 may be capable of processing instructions stored by memory 36. Processors 30 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory 36 may be configured to store information within computing device 28 during operation. Memory 36 may include a computer-readable storage medium or computer-readable storage device. In some examples, memory 36 include one or more of a short-term memory or a long-term memory. Memory 36 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, memory 36 is used to store program instructions for execution by processors 30. Memory 36 may be used by software or applications running on computing device 28 (e.g., authentication unit 20) to temporarily store information during program execution.

Computing device 28 may utilize communication units 34 to communicate with external devices via one or more networks or via wireless signals. Communication units 34 may be network interfaces, such as Ethernet interfaces, optical transceivers, radio frequency (RF) transceivers, or any other type of devices that can send and receive information. Other examples of interfaces may include Wi-Fi, NFC, or Bluetooth radios. In some examples, computing device 28 utilizes communication units 34 to wirelessly communicate with an external device, such as electric current controller 170, chemical analysis device 180, and data acquisition/control module 190 from FIG. 1.

UI devices 32 may be configured to operate as both input devices and output devices. For example, UI devices 32 may be configured to receive tactile, audio, or visual input from a user of computing device 28. In addition to receiving input from a user, UI devices 32 may be configured to provide output to a user using tactile, audio, or video stimuli. In one example, UI devices 32 may be configured to output content such as a GUI for display at a display device. UI devices 32 may include a presence-sensitive display that displays a GUI and receives input from a user using capacitive, inductive, and/or optical detection at or near the presence sensitive display.

Other examples of UI devices 32 include a mouse, a keyboard, a voice responsive system, video camera, microphone or any other type of device for detecting a command from a user, or a sound card, a video graphics adapter card, or any other type of device for converting a signal into an appropriate form understandable to humans or machines. Additional examples UI devices 32 include a speaker, a cathode ray tube (CRT) monitor, a liquid crystal display (LCD), organic light emitting diode (OLED), or any other type of device that can generate intelligible output to a user.

Operating system 38 controls the operation of components of computing device 28. For example, operating system 38, in one example, facilitates the communication of UI module 40, telemetry module 42, and trace detection control unit 20 with processors 30, UI devices 32, communication units 34, and memory 36. UI module 40, telemetry module 42, and trace detection control unit 20 may each include program instructions and/or data stored in memory 36 that are executable by processors 30. For example, authentication unit 20 may include instructions that cause computing device 28 to perform one or more of the techniques described in this disclosure.

Computing device 28 may include additional components that, for clarity, are not shown in FIG. 9. For example, computing device 28 may include a battery to provide power to the components of computing device 28. Similarly, the components of computing device 28 shown in FIG. 9 may not be necessary in every example of computing device 28.

In the example illustrated in FIG. 9, trace detection control unit 20 may be configured to control trace detection system 100 and/or any of its components, e.g., thermal desorber 102, clamping assembly 104, electric current controller 170, chemical analysis device 180, data acquisition/control module 190, and/or any other hardware of trace detection system 100, e.g., motors to move clamps 130, 150, a fan to move vapor 112 to chemical analysis device 180, and the like. In some examples, trace detection control unit 20 may be configured to determine any of the presence of vaporized sample material, a composition of sample material, an amount of the sample material, and/or an amount of each component of the composition of the sample material, e.g., based on data received from data acquisition/control module 190 and/or chemical analysis device 180 telemetry module 42. In some examples, trace detection control unit 20 may cause computing device and/or processors 30 to execute portions of method 800 described above.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit and/or control system (e.g., control system 122, 222) including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

This Disclosure Includes the Following Non-Limiting Examples.

Example 1: A system including: a conductive sampling swab comprising a non-mesh substrate; and a thermal desorber comprising a clamping assembly configured to releasably hold the conductive sampling swab, wherein the clamping assembly is configured to be electrically connected to a voltage or current source, wherein the thermal desorber is configured to resistively heat the conductive sampling swab to a temperature sufficient to vaporize a sample material disposed on the conductive sampling swab.

Example 2: The system of example 1, wherein the non-mesh substrate comprises a metal foil.

Example 3: The system of example 2, wherein the metal foil comprises at least one of 1095 carbon steel or a spring steel.

Example 4: The system of any one of examples 1 through 3, wherein the conductive sampling swab has a Young's modulus greater than or equal to 9,000 kilopounds per square inch (ksi), wherein the conductive sampling swab has a resistivity greater than or equal to 50 micro Ohm-centimeters (me-cm).

Example 5: The system of any one of examples 1 through 4, wherein the conductive sampling swab has a surface arithmetic roughness average (Ra) of greater than or equal to 0.25 micrometers.

Example 6: The system of example 5, wherein the conductive sampling swab comprises at least one of a graphite coating or a graphene coating disposed on the non-mesh substrate.

Example 7: The system of any one of examples 1 through 6, wherein the conductive sampling swab is configured to be reusable and replaceable within the clamping assembly.

Example 8: The system of any one of examples 1 through 7, wherein the clamping assembly is configured to be electrically connected to the conductive sampling swab.

Example 9: The system of example 8, wherein the clamping assembly is configured to contact the conductive sampling swab with a substantially even pressure over a first area at a first position on the conductive sampling swab and with a substantially even pressure over a second area at a second position on the conductive sampling swab.

Example 10: The system of any one of examples 1 through 9, wherein the temperature sufficient to vaporize the sample material disposed on the conductive sampling swab is greater than or equal to 500 degrees Celsius.

Example 11: The system of any one of examples 1 through 10, wherein the thermal desorber is configured to at least one of flash heat the conductive sampling swab or heat the conductive sampling swab according to a temperature profile.

Example 12: The system of any one of examples 1 through 11, wherein the sample material comprises at least one of an explosive, a narcotic, a chemical warfare agent, a pesticide, a toxic industrial chemical, or a pharmaceutical trace contaminant.

Example 13: The system of any one of examples 1 through 12, wherein the sample material comprises at least one of sodium nitrate, potassium nitrate, strontium nitrate, barium nitrate, sodium chlorate, potassium chlorate, sodium perchlorate, potassium perchlorate, sodium permanganate, or potassium permanganate.

Example 14: A method including: inserting a conductive sampling swab into a thermal desorber, wherein the conductive sampling swab comprises a non-mesh substrate; clamping, via a clamping assembly of the thermal desorber, the conductive sampling swab, wherein the clamping assembly is configured to be electrically connected to a voltage or current source; and resistively heating the conductive sampling swab, via a current applied through the conductive sampling swab, to a temperature sufficient to vaporize a sample material disposed on the conductive sampling swab.

Example 15: The method of example 14, wherein the non-mesh substrate comprises a metal foil.

Example 16: The method of example 15, wherein the metal foil comprises at least one of 1095 carbon steel or a spring steel.

Example 17: The method of any one of examples 14 through 16, wherein the conductive sampling swab has a Young's modulus greater than or equal to 9,000 kilopounds per square inch (ksi), wherein the conductive sampling swab has a resistivity greater than or equal to 50 micro Ohm-centimeters (me-cm).

Example 18: The method of any one of examples 14 through 17, wherein the conductive sampling swab has a surface arithmetic roughness average (Ra) of greater than or equal to 0.25 micrometers.

Example 19: The method of example 18, wherein the conductive sampling swab comprises at least one of a graphite coating or a graphene coating on the non-mesh substrate.

Example 20: The method of any one of examples 14 through 19, wherein the conductive sampling swab is configured to be reusable and replaceable within the clamping assembly.

Example 21: The method of any one of examples 14 through 20, wherein the clamping assembly is configured to be electrically connected to the conductive sampling swab.

Example 22: The method of example 21, wherein the clamping assembly is configured to contact the conductive sampling swab with an even pressure over a first area at a first position on the conductive swab and with an even pressure over a second area at a second position on the conductive swab.

Example 23: The method of any one of examples 14 through 22, wherein the temperature sufficient to vaporize the sample material disposed on the conductive sampling swab is greater than or equal to 500 degrees Celsius.

Example 24: The method of any one of examples 14 through 23, wherein the thermal desorber is configured to at least one of flash heat the conductive sampling swab or heat the conductive sampling swab according to a temperature profile.

Example 25: The method of any one of examples 14 through 24, wherein the sample material comprises at least one of an explosive, a narcotic, a chemical warfare agent, a pesticide, a toxic industrial chemical, or a pharmaceutical trace contaminant.

Example 26: The method of any one of examples 14 through 25, wherein the sample material comprises at least one of sodium nitrate, potassium nitrate, strontium nitrate, barium nitrate, sodium chlorate, potassium chlorate, sodium perchlorate, potassium perchlorate, sodium permanganate, or potassium permanganate.

Example 27: A trace detection system including: a conductive sampling swab; a thermal desorber includes a clamping assembly configured to releasably hold the conductive sampling swab, wherein the clamping assembly is configured to be electrically connected to a voltage or current source and the conductive sampling swab, wherein the clamping assembly is configured to contact the conductive sampling swab with a substantially even pressure over a first area at a first position on the conductive swab and with a substantially even pressure over a second area at a second position on the conductive swab and conduct a voltage or current to the conductive sampling swab via the first and second areas while holding the conductive sampling swab; the voltage or current source; a trace detector configured to determine at least one of a presence or a composition of a vaporized sample material, wherein the thermal desorber is configured to resistively heat a sample material disposed on the conductive sampling swab to a temperature sufficient to vaporize a sample material disposed on the conductive sampling swab by applying a current through the conductive sampling swab, wherein the trace detector is fluidically coupled to the thermal desorber and is configured to receive vaporized sample material.

Example 28: The trace-detection system of example 27, wherein the conductive sampling swab comprises a non-mesh metal foil comprising a carbon steel, wherein the conductive sampling swab has a Young's modulus greater than or equal to 9,000 kilopounds per square inch (ksi), wherein the conductive sampling swab has a resistivity greater than or equal to 50 micro Ohm-centimeters (me-cm).

Example 29: A conductive sampling swab including: a non-mesh substrate, wherein the conductive sampling swab is configured to be replaceably clamped by a clamping assembly of a thermal desorber, wherein the conductive sampling swab is configured to be resistively heated to a temperature sufficient to vaporize a sample material disposed on the conductive sampling swab via the application of a current through the conductive sampling swab by the thermal desorber.

Example 30: The conductive sampling swab of example 29, wherein the non-mesh substrate comprises a metal foil comprising at least one of 1095 carbon steel or a spring steel.

Example 31: The conductive sampling swab of example 29 or example 30 further configured to have a Young's modulus greater than or equal to 9,000 kilopounds per square inch (ksi) and a resistivity greater than or equal to 50 micro Ohm-centimeters (mΩ-cm).

Example 32: The conductive sampling swab of any one of examples 29 through 31 further configured to have a surface arithmetic roughness average (Ra) of greater than or equal to 0.25 micrometers.

Example 33: The conductive sampling swab of example 32 further comprising at least one of a graphite coating or a graphene coating on the non-mesh substrate.

Example 34: The conductive sampling swab of any one of examples 29 through 33, wherein the temperature sufficient to vaporize the sample material is greater than or equal to 500 degrees Celsius.

Example 35: The conductive sampling swab of any one of examples 29 through 34, wherein the sample material comprises at least one of an explosive, a narcotic, a chemical warfare agent, a pesticide, a toxic industrial chemical, or a pharmaceutical trace contaminant.

Example 36: The sampling swab of any one of examples 29 through 35, wherein the sample material comprises at least one of sodium nitrate, potassium nitrate, strontium nitrate, barium nitrate, sodium chlorate, potassium chlorate, sodium perchlorate, potassium perchlorate, sodium permanganate, or potassium permanganate.

Example 37: A thermal desorber including: a clamping assembly configured to releasably hold a conductive sampling swab, wherein the clamping assembly is configured to be electrically connected to a voltage or current source, wherein the clamping assembly is configured to be electrically connected to the conductive sampling swab, wherein the thermal desorber is configured to resistively heat the conductive sampling swab to a temperature sufficient to vaporize a sample material disposed on the conductive sampling swab.

Example 38: The thermal desorber of example 37, wherein the clamping assembly is configured to contact the conductive sampling swab with an even pressure over a first area at a first position on the conductive swab and with an even pressure over a second area at a second position on the conductive sampling swab.

Example 39: The thermal desorber of example 37 or example 38, wherein the temperature sufficient to vaporize the sample material disposed on the conductive sampling swab is greater than or equal to 500 degrees Celsius.

Example 40: The thermal desorber of any one of examples 37 through 39, wherein the thermal desorber is configured to at least one of flash heat the conductive sampling swab or heat the conductive sampling swab according to a temperature profile.

Example 41: The thermal desorber of any one of examples 37 through 40, wherein the sample material comprises at least one of an explosive, a narcotic, a chemical warfare agent, a pesticide, a toxic industrial chemical, or a pharmaceutical trace contaminant.

Example 42: The thermal desorber of any one of examples 37 through 41, wherein the sample material comprises at least one of sodium nitrate, potassium nitrate, strontium nitrate, barium nitrate, sodium chlorate, potassium chlorate, sodium perchlorate, potassium perchlorate, sodium permanganate, or potassium permanganate.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Based upon the above discussion and illustrations, it is recognized that various modifications and changes may be made to the disclosed technology in a manner that does not necessarily require strict adherence to the examples and applications illustrated and described herein. Such modifications do not depart from the true spirit and scope of various aspects of the disclosure, including aspects set forth in the claims.

Various examples have been described. These and other examples are within the scope of the following claims.

What is claimed is:

1. A system comprising:
a conductive sampling swab comprising a non-mesh substrate; and
a thermal desorber comprising a clamping assembly configured to releasably hold the conductive sampling swab, wherein the clamping assembly is configured to be electrically connected to a voltage or current source, wherein the clamping assembly is configured to move to electrically contact the conductive sampling swab, wherein the clamping assembly is configured to move to electrically disconnect from the conductive sampling swab, and
wherein the thermal desorber is configured to resistively heat the conductive sampling swab to a temperature sufficient to vaporize a sample material disposed on the conductive sampling swab.

2. The system of claim 1, wherein the conductive sampling swab has a Young's modulus greater than or equal to 9,000 kilopounds per square inch (ksi), wherein the conductive sampling swab has a resistivity greater than or equal to 50 micro Ohm-centimeters (mW-cm).

3. The system of claim 1, wherein the conductive sampling swab is configured to be reusable and replaceable within the clamping assembly.

4. The system of claim 1, wherein the temperature sufficient to vaporize the sample material disposed on the conductive sampling swab is greater than or equal to 500 degrees Celsius.

5. The system of claim 1, wherein the thermal desorber is configured to at least one of flash heat the conductive sampling swab or heat the conductive sampling swab according to a temperature profile.

6. The system of claim 1, wherein the sample material comprises at least one of an explosive, a narcotic, a chemical warfare agent, a pesticide, a toxic industrial chemical, or a pharmaceutical trace contaminant.

7. The system of claim 1, wherein the sample material comprises at least one of sodium nitrate, potassium nitrate, strontium nitrate, barium nitrate, sodium chlorate, potassium chlorate, sodium perchlorate, potassium perchlorate, sodium permanganate, or potassium permanganate.

8. The system of claim 1, wherein the non-mesh substrate comprises a metal foil.

9. The system of claim 8, wherein the metal foil comprises at least one of 1095 carbon steel or a spring steel.

10. The system of claim 1, wherein the conductive sampling swab has a surface arithmetic roughness average (Ra) of greater than or equal to 0.25 micrometers.

11. The system of claim 10, wherein the conductive sampling swab comprises at least one of a graphite coating or a graphene coating disposed on the non-mesh substrate.

12. The system of claim 1, wherein the clamping assembly is configured to be electrically connected to the conductive sampling swab.

13. The system of claim 12, wherein the clamping assembly is configured to contact the conductive sampling swab with a substantially even pressure over a first area at a first position on the conductive sampling swab and with a substantially even pressure over a second area at a second position on the conductive sampling swab.

14. A method comprising:
inserting a conductive sampling swab into a thermal desorber, wherein the conductive sampling swab comprises a non-mesh substrate;
clamping, via a clamping assembly of the thermal desorber, the conductive sampling swab, wherein the clamping assembly is configured to be electrically connected to a voltage or current source, wherein the clamping assembly is configured to move to electrically contact the conductive sampling swab, wherein the clamping assembly is configured to move to electrically disconnect from the conductive sampling swab; and
resistively heating the conductive sampling swab, via a current applied through the conductive sampling swab, to a temperature sufficient to vaporize a sample material disposed on the conductive sampling swab.

15. The method of claim 14, wherein the non-mesh substrate comprises a metal foil.

16. The method of claim 14, wherein the clamping assembly is configured to be electrically connected to the conductive sampling swab.

17. The method of claim 16, wherein the clamping assembly is configured to contact the conductive sampling swab with an even pressure over a first area at a first position on the conductive swab and with an even pressure over a second area at a second position on the conductive swab.

* * * * *